United States Patent
Wilenski et al.

(10) Patent No.: US 10,005,256 B2
(45) Date of Patent: Jun. 26, 2018

(54) SELECTIVELY WEAKENED STRETCHED FILMS

(75) Inventors: Mark S. Wilenski, Mercer Island, WA (US); Michael P. Kozar, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 1277 days.

(21) Appl. No.: 13/523,141

(22) Filed: Jun. 14, 2012

(65) Prior Publication Data

US 2013/0337230 A1    Dec. 19, 2013

(51) Int. Cl.
*B32B 3/26* (2006.01)
*B32B 3/28* (2006.01)
*B32B 5/14* (2006.01)

(52) U.S. Cl.
CPC .......... *B32B 5/14* (2013.01); *Y10T 29/49* (2015.01); *Y10T 29/49826* (2015.01); *Y10T 156/10* (2015.01); *Y10T 428/24479* (2015.01); *Y10T 428/24694* (2015.01); *Y10T 428/24711* (2015.01); *Y10T 428/24802* (2015.01)

(58) Field of Classification Search
CPC ........... Y10T 428/15; Y10T 428/24479; Y10T 156/10; Y10T 29/49826; Y10T 428/24694; Y10T 428/24711; B32B 3/28; B32B 3/263; B32B 3/266; B32B 5/142; B32B 5/145; B32B 5/147; F41H 5/0407; F41H 5/04
USPC .......................................................... 428/43
See application file for complete search history.

(56) References Cited

U.S. PATENT DOCUMENTS

| | | | | |
|---|---|---|---|---|
| 3,569,995 A | * | 3/1971 | Mallon | G01T 1/04 250/473.1 |
| 4,465,729 A | * | 8/1984 | Cancio | B44C 1/10 156/209 |
| 4,704,315 A | | 11/1987 | McClintock | |
| 5,580,629 A | * | 12/1996 | Dischler | F41H 5/0485 2/2.5 |
| 2005/0227564 A1 | | 10/2005 | Bond | |
| 2007/0297702 A1 | | 12/2007 | Zaggia | |
| 2009/0047482 A1 | * | 2/2009 | Starke | B64C 3/28 428/182 |
| 2009/0269538 A1 | | 10/2009 | Buhring | |
| 2009/0311466 A1 | * | 12/2009 | Marissen | F41H 5/0428 428/107 |
| 2011/0210161 A1 | | 9/2011 | Madai | |

FOREIGN PATENT DOCUMENTS

| | | |
|---|---|---|
| DE | 102009043360 | 5/2011 |
| DE | 202011002787 | 5/2011 |
| GB | 1025623 | 4/1966 |
| JP | S61143116 | 6/1986 |
| WO | WO1989009129 | 10/1989 |

(Continued)

OTHER PUBLICATIONS

U.S. Appl. No. 12/968,514, Controlled Fiber-Matrix Adhesion in Polymer Fiber Composites, filed Dec. 15, 2010.

(Continued)

*Primary Examiner* — Joanna Pleszczynska

(57) ABSTRACT

A film for a composite article may include a non-weakened portion and a weakened portion. The weakened portion may have at least one property that may be lower than the property of the non-weakened portion.

37 Claims, 16 Drawing Sheets

(56) References Cited

FOREIGN PATENT DOCUMENTS

| WO | WO02094674 | 11/2002 |
|----|------------|---------|
| WO | WO2006016393 | 2/2006 |
| WO | WO2010066819 | 6/2010 |
| WO | WO2010066819 | 6/2010 |

OTHER PUBLICATIONS

U.S. Appl. No. 12/968,535, Fibers With Interlocking Shapes. filed Dec. 15, 2010.
U.S. App. No. 12/968,557, Optimized Fiber Shapes for Improved Optical Performance, filed Dec. 15, 2010.
U.S. Appl. No. 12/969,532, Sandwiched Fiber Composites for Ballistic Applications, filed Dec. 15, 2010.
U.S. Appl. No. 12/968,575, Selectively Coupled Fibers in Composites, filed Dec. 15, 2010.
U.S. Appl. No. 12/901,342, Transparent Composites With Organic Fiber, filed Oct. 8, 2010.
U.S. Appl. No. 13/450,823, Composite Articles Having Fibers With Longitudinally-Varying Geometry, filed Apr. 19, 2012.
Canadian Office Action, Application No. 2,815,473, dated May 24, 2016.
European Search Report for Application No. 13170925.5-1305 dated Aug. 2, 2013.
Australian Office Action for Application No. 2013205456 dated Dec. 2, 2015.
Canadian Office Action, application No. 2,815,473, dated Jan. 5, 2017.
Chinese Office Action for Application No. 201310236333.X dated Dec. 14, 2016.
European Search Report, application EP 13170925.5 dated Dec. 18, 2013.
Japanese Office Action for Application No. 2013-121598 dated Feb. 2, 2017.
hinese Office Action for Application No. 201310236333.X dated Feb. 2, 2017.
Russian Office Action for Application No. 2013126911/05, dated Aug. 16, 2017.
Canadian Office Action, application No. 2,815,473, dated Aug. 9, 2017.
Russian Office Action for Application No. 2013126911/05 dated Apr. 21, 2017.
GCC Patent Office, Examination Report for Application No. GC 2013-24637 dated Oct. 24, 2017.
European Search Report for EP Application No. 13170925.5 dated Oct. 18, 2017.

\* cited by examiner

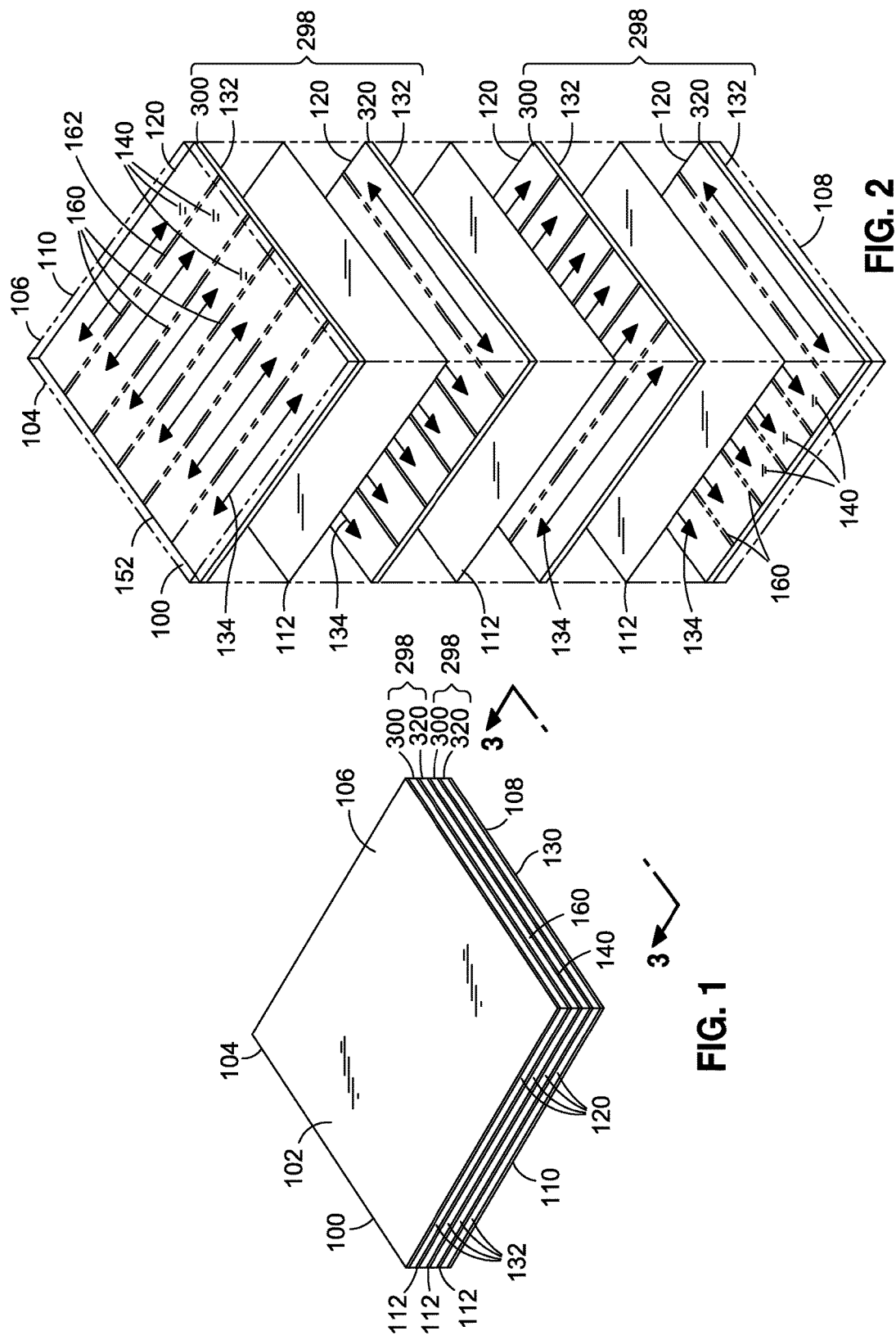

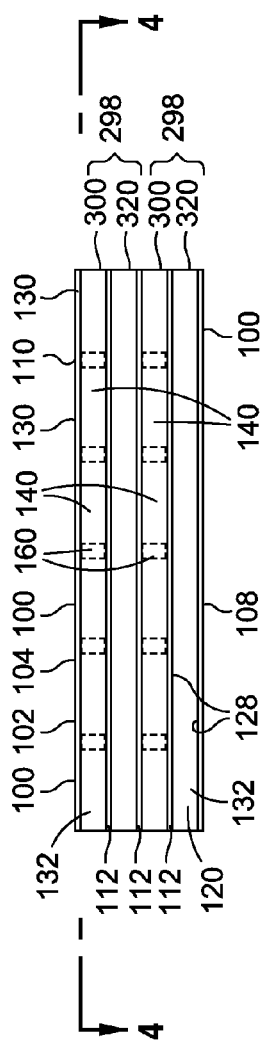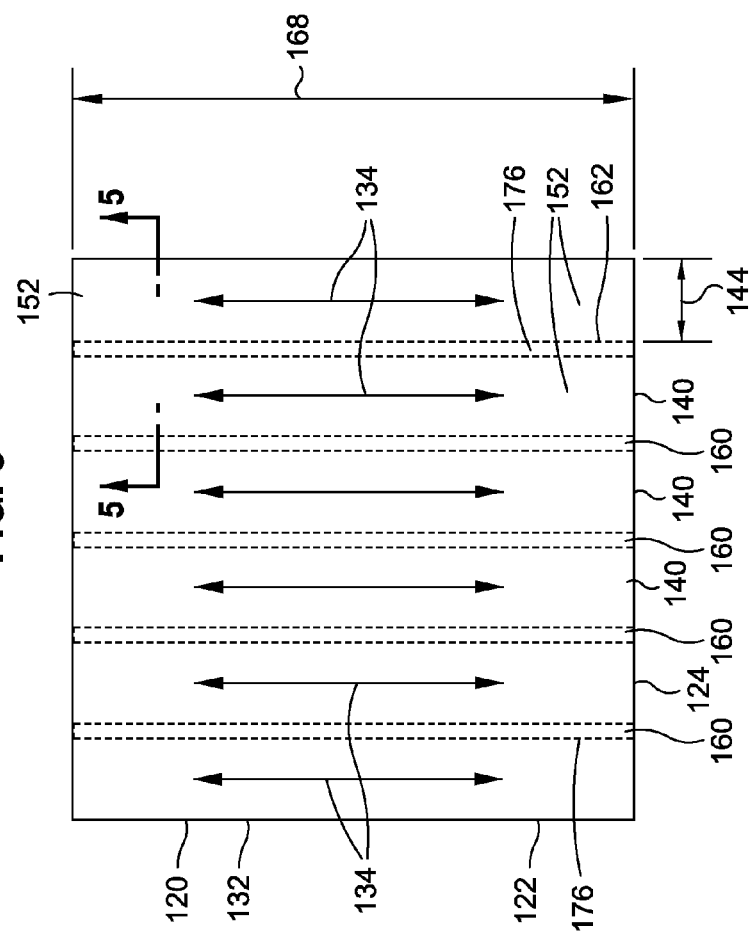

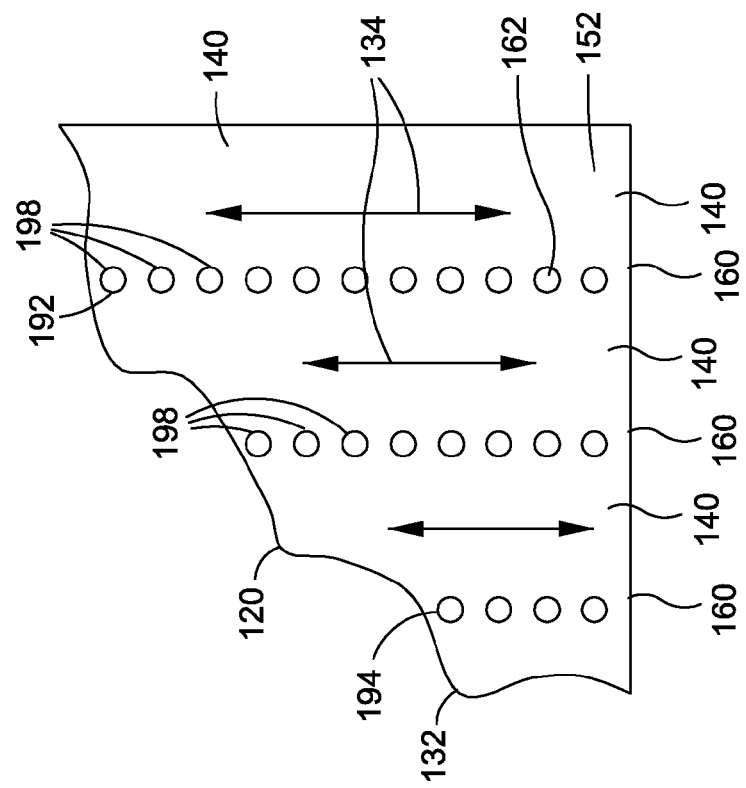
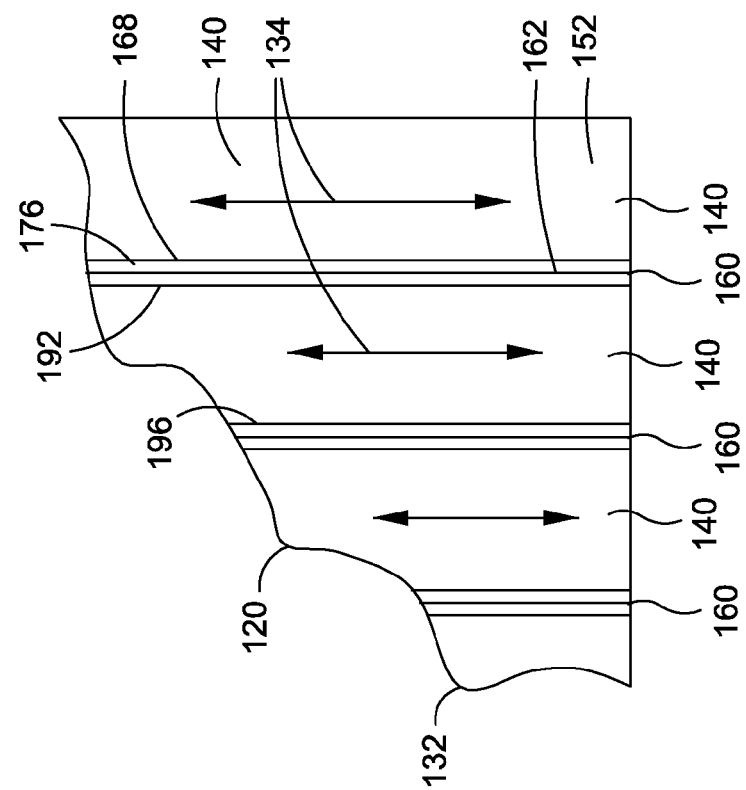

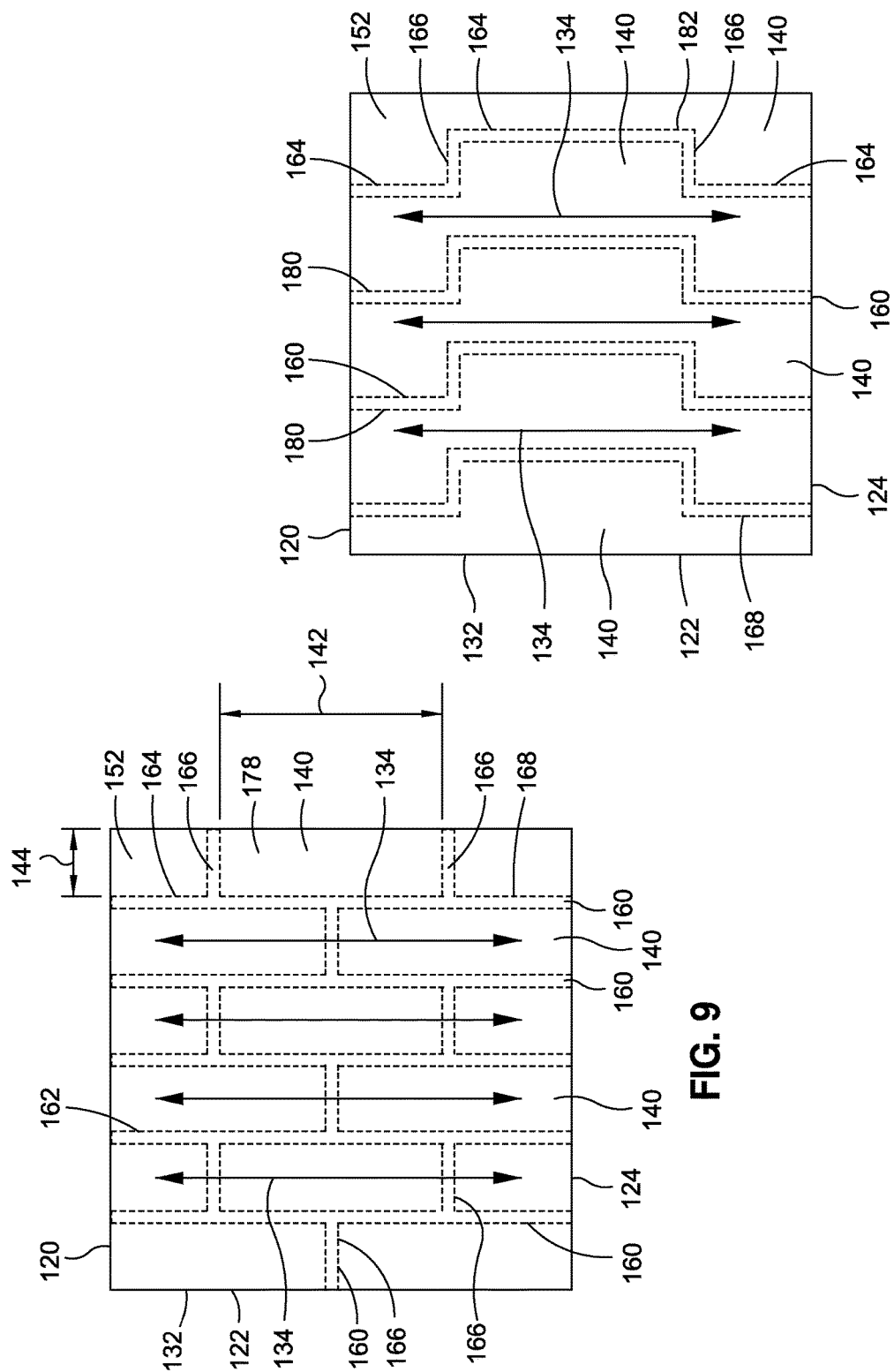

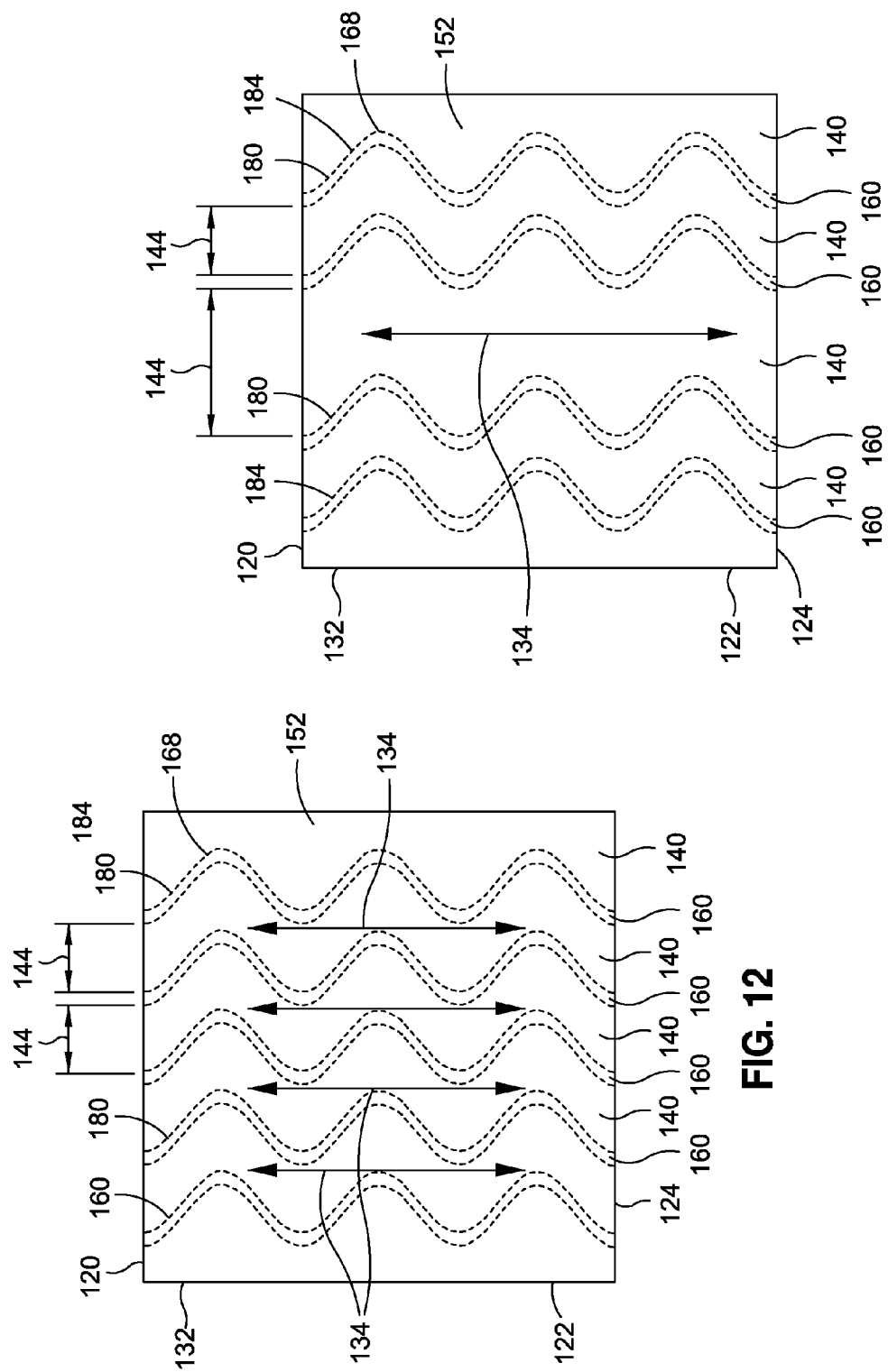

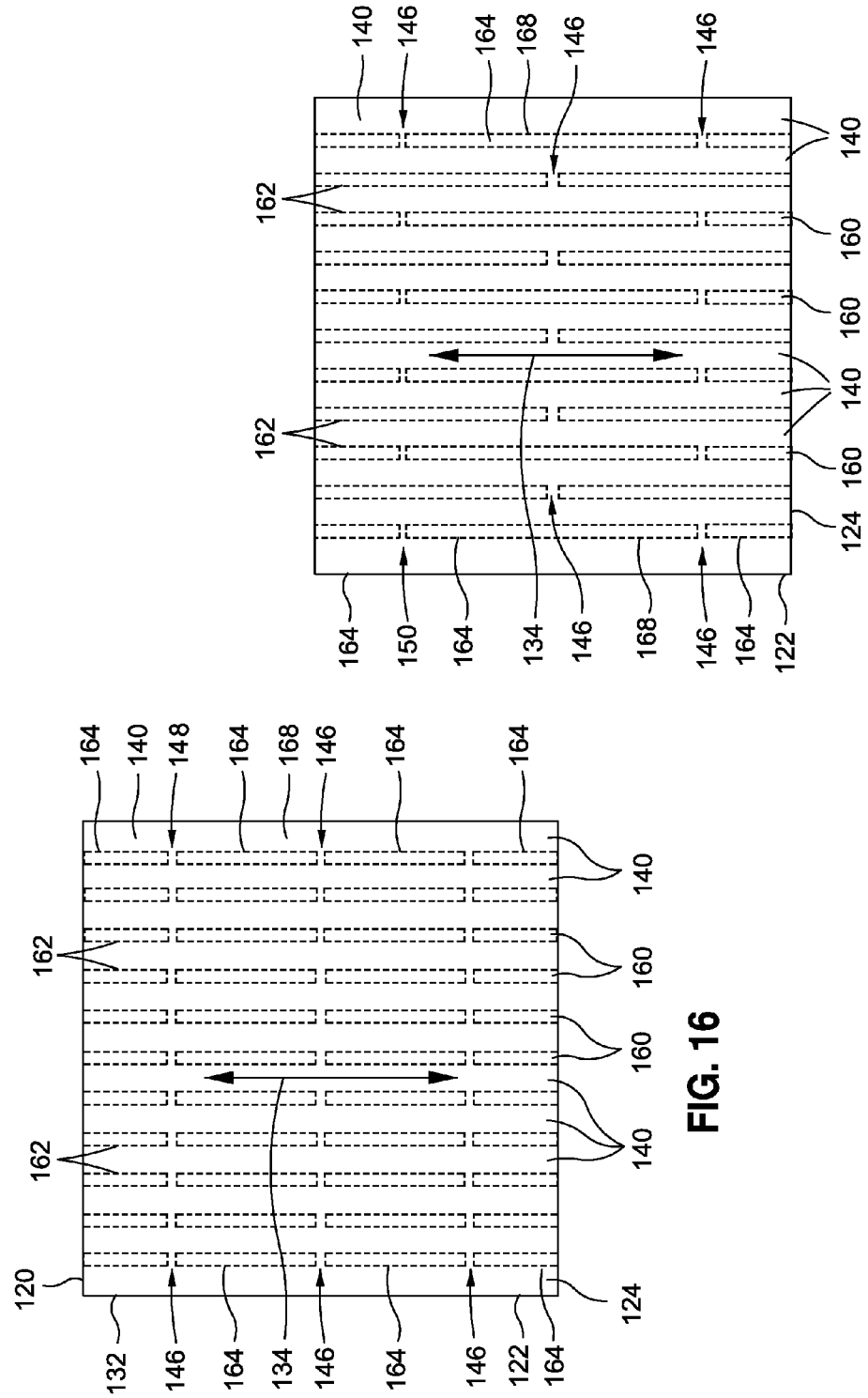

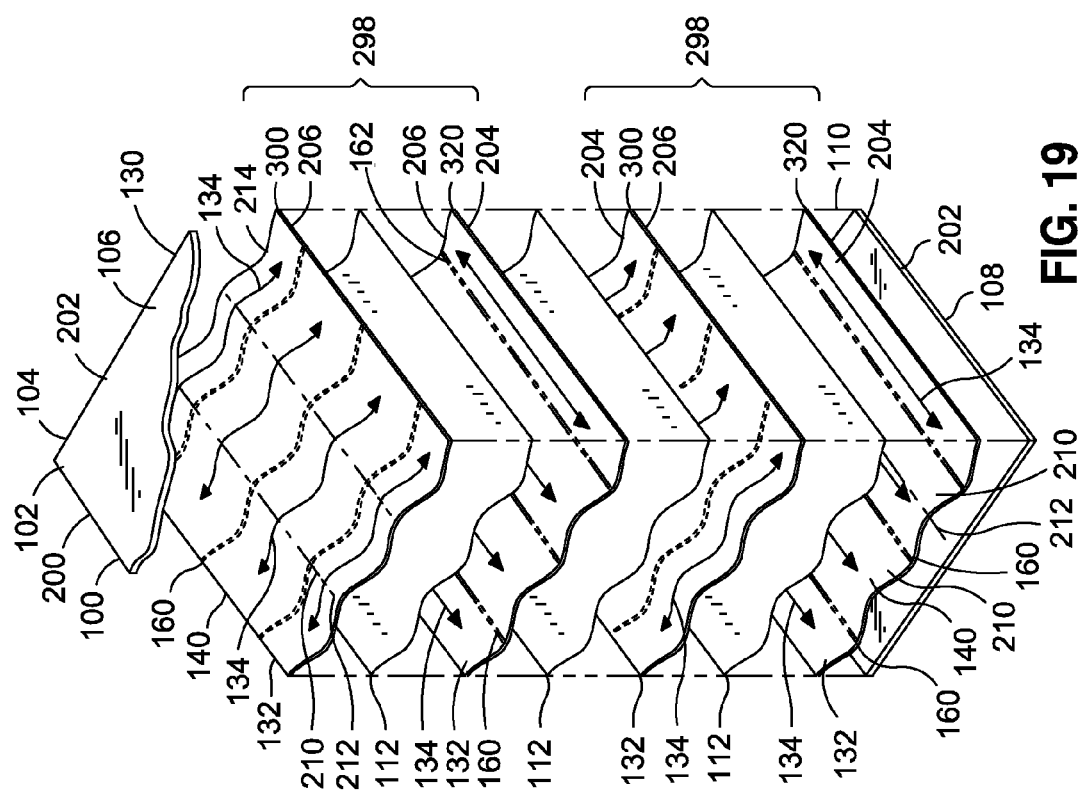
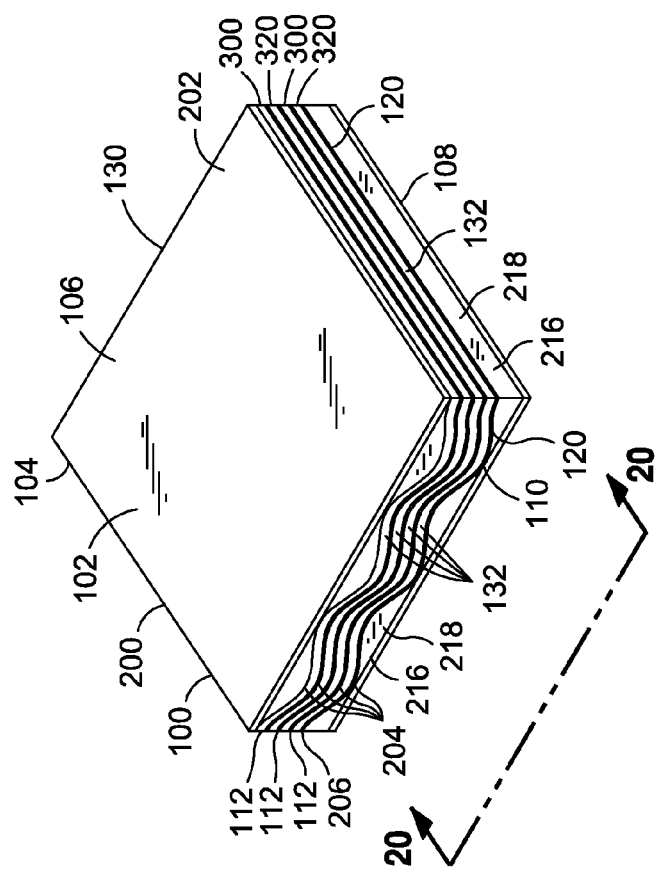

SELECTIVELY WEAKENED STRETCHED FILMS

CROSS-REFERENCE TO RELATED APPLICATIONS

This application is related to co-filed application Serial No (unknown) entitled BICOMPONENT FIBERS CONTAINING NANO-FILAMENTS FOR USE IN OPTICALLY TRANSPARENT COMPOSITES and filed on Jun. 14, 2012, the entire contents of which is incorporated by reference herein.

FIELD

The present disclosure relates generally to composites and, more particularly, to composite articles comprised of films providing improved ballistic performance and optical performance.

BACKGROUND

Conventional composite structures are typically comprised of reinforcing fibers embedded in a matrix. Fiber-reinforced composite structures are typically designed to transmit loads along the length of the fibers. Loads from one fiber may be transferred to another fiber in the same layer or to fibers in an adjacent layer by passing through the matrix material. However, the matrix is typically weaker than the fibers such that when a sufficiently high load is transmitted from one fiber to another fiber across the matrix, the matrix will fail. The failure of the matrix allows the fibers to move within the composite structure.

During a ballistic event wherein a composite panel is impacted by a projectile, the ability of the fibers to move within the matrix may affect the ballistic performance of the composite panel. For example, the ability of the fibers in the matrix to move may affect the resistance of the composite panel to penetration by the projectile. For transparent composite panels, movement of the fibers relative to the matrix may also affect the optical performance of the composite panel. For example, movement of the fibers relative to the matrix during a ballistic event may affect the size of an optically-degraded area of the composite panel as a result of impact by the projectile.

As can be seen, there exists a need in the art for a composite structure wherein movement of the fibers within the matrix can be controlled in a manner such that the ballistic performance of the composite structure may be improved.

BRIEF SUMMARY

The above-described needs associated with composite articles are specifically addressed and alleviated by the present disclosure which, in an embodiment, provides a film for a composite article wherein the film may include a weakened portion and a non-weakened portion. The weakened portion may have at least one property that may be lower than the property of the non-weakened portion.

Also disclosed is a composite article having a plurality of films. The films may be arranged in a stacked formation. At least one of the films may have a non-weakened portion and a weakened portion. The weakened portion may have at least one property that may be lower than the property of the non-weakened portion.

In addition, disclosed is a method of forming a film. The method may include forming a stretched film having a weakened portion and a non-weakened portion. The method may also include configuring the stretched film such that the weakened portion has at least one property that is lower than the property of the non-weakened portion.

In a further embodiment, disclosed is a method of forming a composite article including providing a plurality of stretched films wherein each one of the stretched films may have a non-weakened portion and a weakened portion. The weakened portion of at least one of the stretched films may be formed in the shape of a line, a rectangle, and/or the shape of a tortuous path. The weakened portion may also have at least one property that may be lower than the property of the non-weakened portion. The method of forming the composite article may include arranging a plurality of the stretched films in a stacked formation.

Also disclosed is a method of using a composite article. The method may include providing a composite article having a plurality of films. Each one of the films may have a non-weakened portion and a weakened portion. The weakened portion may have at least one property that is lower than the property of the non-weakened portion. The method of use may include placing the composite article in a non-loaded condition. The method may further include placing the composite article in a loaded condition.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numerals refer to like parts throughout and wherein:

FIG. 1 is a perspective view of a composite article in an embodiment comprising a plurality of films having weakened portions formed in the film;

FIG. 2 is an exploded perspective view of the composite article of FIG. 1;

FIG. 3 is a side view of the composite article of FIG. 1 and illustrating the films arranged in a stacked formation;

FIG. 4 is a top view of one of the films of FIG. 3 illustrating an arrangement of weakened portions and non-weakened portions in a film;

FIG. 7 is a top view of a portion of a film illustrating weakened portions formed as continuous lengthwise weakened segments;

FIG. 8 is a top view of a portion of the film illustrating weakened portions formed as a series of indentations;

FIG. 9 is a top view of an embodiment of a film having weakened portions arranged as a plurality of lengthwise weakened segments interconnected by transverse weakened segments;

FIG. 10 is a top view of an embodiment of a film having weakened portions comprised of a plurality of lengthwise weakened segments and transverse weakened segments arranged in a stepped shape;

FIG. 12 is a top view of an embodiment of a film having weakened portions arranged in a sinusoidal shape with substantially uniform spacings between the weakened portions;

FIG. 13 is a top view of an embodiment of a film having weakened portions arranged in a sinusoidal shape with different width spacings between the weakened portions;

FIG. 16 is a top view of an embodiment of a film having a series of lengthwise weakened segments forming a plurality of aligned non-weakened connections between the non-weakened portions of the film;

FIG. 17 is a top view of an embodiment of a film having a series of lengthwise weakened segments forming a plurality of staggered non-weakened connections between the non-weakened portions of the film;

FIG. 18 is a perspective view of a corrugated composite article;

FIG. 19 is an exploded perspective view of the corrugated composite article of FIG. 18 and illustrating a plurality of corrugated films having selectively weakened portions;

DETAILED DESCRIPTION

Figure 5:
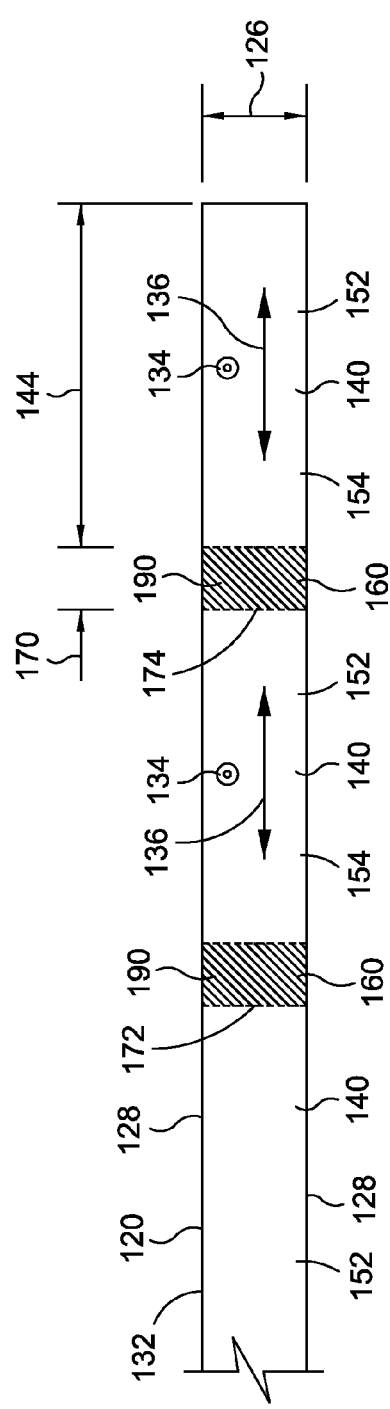
FIG. 5 is a cross-sectional view of a portion of a film illustrating an embodiment of the weakened portions formed by chemical modification to reduce a strength in the weakened portion.

Referring now to the drawings wherein the showings are for purposes of illustrating preferred and various embodiments of the disclosure, shown in FIG. 1 is a composite article 100. The composite article 100 may be configured as a composite panel 104 having article surfaces 102 on upper and lower sides 106, 108 of the composite panel 104. The composite article 100 may be fabricated from a plurality of films 120 and arranged in a stacked formation 130. The films 120 may be laminated or bonded together using one or more adhesive layers 112 or using adhesive matrix material 110. In an embodiment, the adhesive layer 112 may be optically-matched to the film 120. For example, the adhesive layers 112 and the films 120 may have refractive indices that are complementary to one another or that are substantially equivalent for a predetermined wavelength band such as within the visible spectrum and/or the infrared spectrum.

Figure 6:
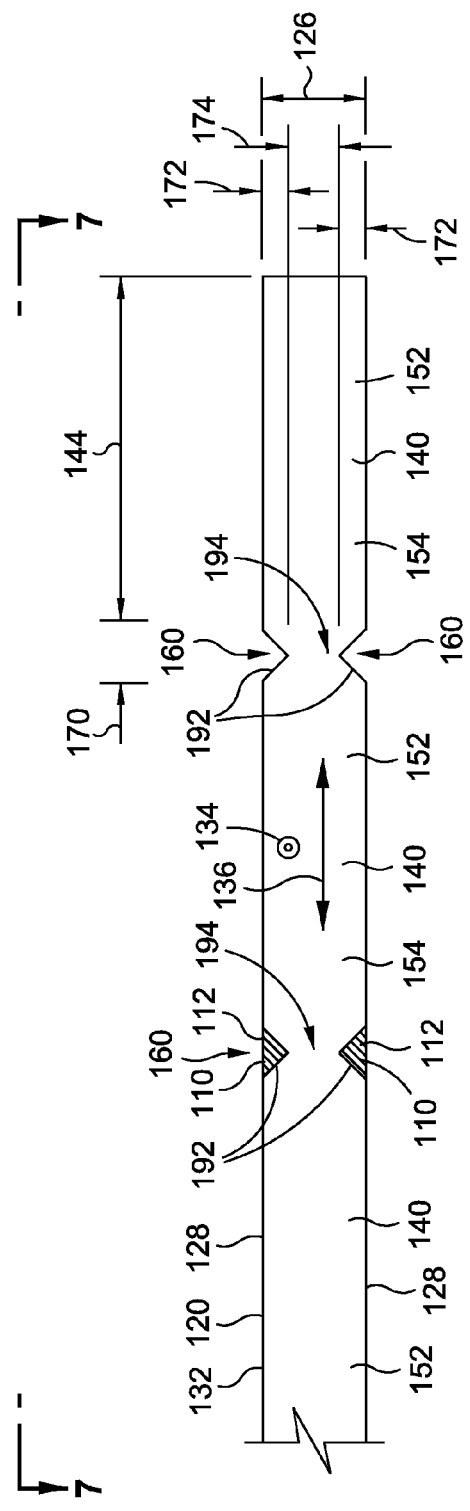
FIG. 6 is a cross-sectional view of a portion of a film illustrating an embodiment of the weakened portions formed by geometric modification to reduce a strength in the weakened portion.

Referring to FIG. 2, shown is an exploded perspective view of the composite article 100 of FIG. 1 showing a plurality of polymeric films 120 in the stacked formation 130. One or more of the films 120 in the composite article 100 may advantageously be stretched along at least one stretched direction 134. The strength of the film 120 along a stretched direction 134 may be higher than the strength of the film 120 along a non-stretched direction or transverse direction 136 (FIG. 6). The transverse direction 136 may be oriented generally perpendicular to the stretched direction 134. One or more adjacent pairs of the films 120 may be bonded together using a relatively thin adhesive layer 112. Each adhesive layer 112 may form a thin bondline between the faying surfaces of the films 120. The adhesive layer 112 may be formed of matrix material, resin, or other material that may be installed between the adjacent films 120 for adhesively bonding the films 120 together.

In FIG. 2, each one of the films 120 may include a plurality of weakened portions 160 which may be formed as relatively narrow strips or paths arranged in a predetermined pattern in a film 120. For example, the weakened portions 160 may be formed in the shape of a line 176 (FIG. 4) along a lengthwise path 162 (FIG. 4) in the films 120. As indicated above, one or more of the films 120 may comprise a stretched film 132. The weakened portions 160 in a stretched film 132 may be generally aligned or parallel with the stretched direction 134 of the stretched film 132. However, one or more of the weakened portions 160 of a stretched film 132 may be oriented along one or more directions that are generally non-parallel to the stretched direction 134 of the stretched film 132.

In each film 120, the weakened portions 160 may define a plurality of relatively larger non-weakened portions 140 of the film. The non-weakened portions 140 of each film 120 may comprise a substantial portion of each film 120. FIG. 2 illustrates a plurality of non-weakened portions 140, each having a general ribbon-shaped configuration 152 bounded by the lengthwise paths 162 of the weakened portions 160. The weakened portions 160 of a film 120 may have at least one property that may be lower than the property of the non-weakened portions 140 of the film 120. For example, the weakened portions 160 of a film 120 may be modified to have a reduced strength relative to the strength of a non-weakened portion of the film 120. In an embodiment, one or more of the weakened portions 160 of a film 120 may be chemically modified relative to a non-weakened portion 140 of the film 120 and wherein the chemical modification may cause the weakened portion 160 to have a tensile strength, a tensile modulus, an ultimate strain, and/or other property that is lower than the tensile strength, the tensile modulus, the ultimate strain, and/or other property of a non-weakened portion 140 of the film 120. In a further embodiment, one or more of the weakened portions 160 of a film 120 may be geometrically modified causing the film 120 to have a reduced tensile strength and/or a reduced transverse (e.g., out-of-plane) shear strength relative to the tensile strength and/or transverse shear strength of the film 120 in a non-weakened portion 140.

Advantageously, by providing each film 120 with one or more weakened portions 160 arranged in a desired pattern, the film 120 may fail in a desired manner when subjected to an external load. For example, during a ballistic event wherein a composite panel 104 may be impacted by a projectile (not shown), one or more films 120 in the composite panel 104 may absorb kinetic energy of the projectile by elongating or stretching. One or more of the films 120 in the composite panel 104 may initially fail (e.g., locally fracture) along one or more of the weakened portions 160. Advantageously, the non-weakened portions 140 of the films 120 may remain intact after failure of the weakened portions 160. The intact non-weakened portions 140 may continue to absorb the kinetic energy of the projectile by deflecting, elongating, or stretching as the projectile continues along a path into or through the composite panel 104. The deflection, elongation, or stretching of the non-weakened portions 140 may decelerate the projectile until the non-weakened portions 140 fail upon reaching an ultimate strain of the film material.

Advantageously, by forcing the film 120 to initially fail at the weakened portions 160, the non-weakened portions 140 may continue to undergo a relatively large amount of deflection and elongation (e.g., stretching) prior to failure of the non-weakened portions 140. In addition, for stretched films 132, by orienting the non-weakened portions 140 of the stretched film 132 generally parallel to the stretched direction 134 of the stretched film 132, the higher strength of the stretched film 132 in the stretched direction 134 may provide improved capability for absorbing the energy of an impact relative to the lower energy-absorbing capability along the transverse direction 136 of the stretched film 132. Furthermore, by forcing the stretched film 132 to initially fail at the weakened portions 160, an increased amount of film material may be involved in a ballistic event.

For example, referring to FIG. 2, by forcing the films 120 to initially fail at the weakened portions 160, the non-weakened portions 140 may continue to deflect and elongate resulting in the engagement of additional films 120 in the stacked formation 130 of the composite panel 104. The increased deflection and elongation may increase the amount of non-weakened portions 140 that become involved in a ballistic event. The increased involvement of non-weakened portions 140 in a ballistic event may increase the amount of time during which the films 120 may absorb kinetic energy of the projectile which may reduce or prevent penetration of the composite panel 104 by the projectile. In this regard, by providing films 120 with selectively weakened portions 160, ballistic performance of the composite article 100 may be significantly improved relative to the ballistic performance of conventional composite articles (not shown).

A further advantage provided by the present disclosure is an improvement in the optical performance of a transparent composite article 100 fabricated with stretched films 132 relative to the optical performance of a conventional transparent composite article (not shown) fabricated with fibers (not shown). For example, in a conventional composite article, the fibers may have a generally cylindrical configuration causing each fiber to act as a small lens to light passing through the conventional composite article. The conventional composite article may include a plurality of layers of fibers oriented in different directions. The cumulative effect of the plurality of fibers is a scattering of light as the light passes through the conventional composite article such that objects viewed through the conventional composite article may appear blurred.

Advantageously, in the present disclosure, the weakened portions 160 of the films 120 may have substantially the same optical properties as the non-weakened portions 140 of the film 120 despite the weakened portions 160 having reduced properties (e.g., reduced strength) relative to the properties of the non-weakened portions 140. By providing the film 120 with substantially uniform optical properties throughout the film 120, the selectively weakened films 120 in the present disclosure avoid the undesirable optical effects associated with conventional fiber-reinforced composites.

In FIG. 2, each one of the films 120 may comprise a stretched film 132 having a stretched direction 134 and a transverse direction 136 oriented generally perpendicular to the stretched direction 134. The stretched films 132 may be substantially non-stretched in the transverse direction 136. The stretched films 132 shown in FIG. 2 may be unidirectionally stretched wherein the non-weakened portions 140 may have a tensile strength and/or a tensile modulus in the stretched direction 134 that may be higher than the tensile strength and/or the tensile modulus of the non-weakened portion 140 in the transverse direction 136. However, the composite article 100 may be constructed from stretched films 132 that are bidirectionally stretched (not shown). For example, one or more stretched films 132 in a composite article 100 may be stretched along a lengthwise direction and along a transverse direction 136. Alternatively, it is contemplated that a composite article 100 may be constructed with one or more films 120 that are non-stretched (not shown).

In FIG. 2, the stretched films 132 are arranged such that the stretched direction 134 of each stretched film 132 is oriented generally perpendicular to the stretched direction 134 of the adjacent stretched film 132. However, the stretched films 132 may be arranged in any manner and are not limited to alternating perpendicular orientations of the stretched directions 134. For example, a composite article 100 may be constructed wherein the stretched directions 134 of the stretched films 132 are oriented in substantially the same direction. Alternatively, a composite article 100 may be constructed wherein the stretched directions 134 of the stretched films 132 are oriented at non-perpendicular angles relative to one another. For example, the composite article 100 may be configured such that the stretched directions 134 of one or more stretched films 132 may be oriented at predetermined angles (e.g., 15°, 22.5°, 45°, 60°, 75°, etc.) relative to one another.

Figure 21:
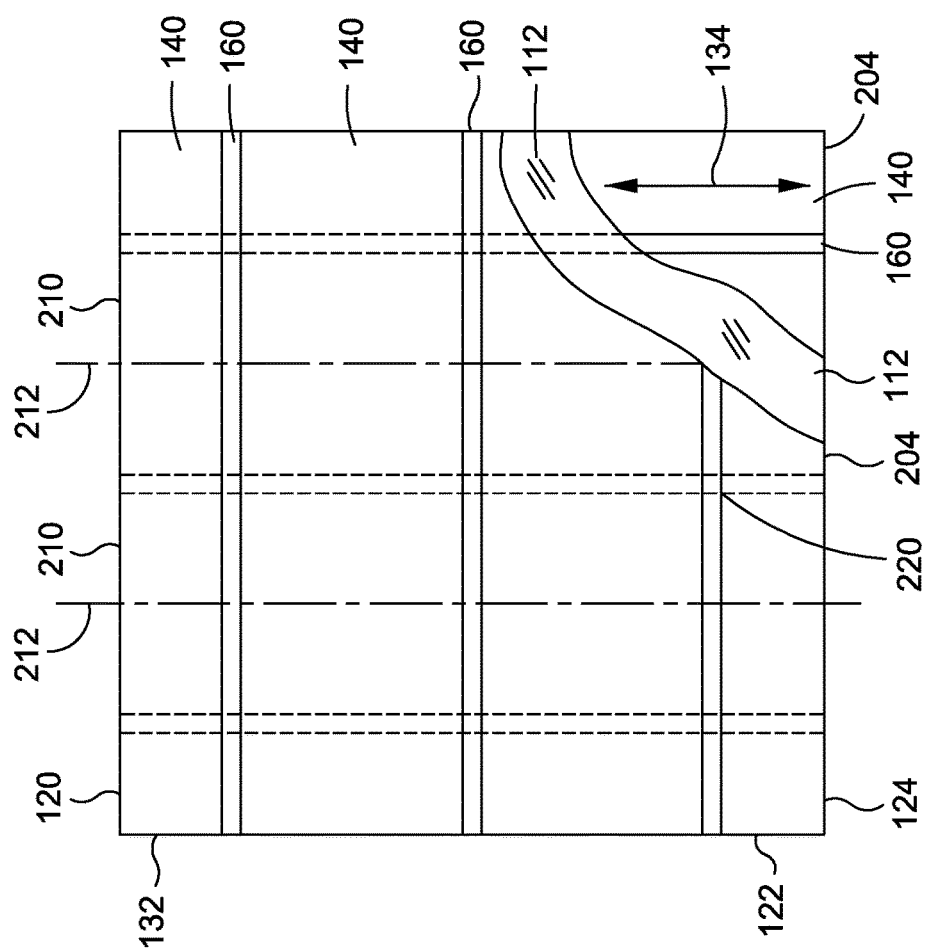
FIG. 21 is a top view of the corrugated films of FIG. 20 illustrating the arrangement of the weakened portions and stretched directions of the corrugated films.

In this same regard, a composite article 100 may be configured having a cross-pattern of weakened portions 220 as shown in FIG. 21 wherein the weakened portions 160 of each one of the stretched film 132 are oriented at generally perpendicular angles relative to the weakened portions 160 of adjacent stretched films 132. However, a composite article 100 may be configured having stretched films 132 with weakened portions 160 generally oriented in the same direction (not shown). Alternatively, a composite article 100 may be configured having stretched films 132 with weakened portions 160 oriented at non-perpendicular angles (e.g., 15°, 22.5°, 45°, 60°, 75°, etc.) relative to weakened portions 160 of adjacent stretched films 132. In addition, a composite article 100 may be configured wherein the orientation of the weakened portions 160 relative to the stretched direction 134 of one of the stretched films 132 is different than the orientation of the weakened portions 160 relative to the stretched direction 134 of one or more of the other stretched films 132 in the composite article 100.

Referring to FIG. 3, shown is the composite article 100 of FIG. 1 illustrating the stretched films 132 in the stacked formation 130. One or more of the stretched films 132 may include one or more non-weakened portions 140. The non-weakened portions 140 may be bounded by weakened portions 160. Each one of the stretched films 132 may include upper and lower film surfaces 128. An adhesive layer 112 may be installed between the upper and lower film surfaces 128 of adjacent stretched films 132 for adhesively bonding the stretched films 132. As indicated above, the adhesive layer 112 may comprise a film 120 of adhesive that may be optically matched to the film 120 such as by substantially matching the refractive indices of the adhesive layer 112 and the film 120 within a wavelength band (e.g., the visible spectrum and/or the infrared spectrum) and/or or by substantially matching the temperature coefficients of refractive index of the adhesive layer 112 and the film 120 within a temperature range (e.g., −65 F to +200 F). A plurality of the adhesive layers 112 may be laid up with the stretched films 132. Alternatively, the adhesive layer 112 may comprise an adhesive matrix material or an adhesive resin that may be applied between the stretched films 132.

FIG. 4 is a top view of one of the stretched films 132 having a film length 122 and a film width 124. In the embodiment shown, the weakened portions 160 are formed in the stretched film 132. Each one of the weakened portions 160 is configured in the shape of a line 176. The weakened portions 160 extend along a lengthwise path 162 that may be oriented generally parallel to the stretched direction 134 of the stretched film 132. Each one of the weakened portions 160 has a weakened portion length 168 that extends along the film length 122. The weakened portions 160 are shown as being generally uniformly spaced across the film width 124 and defining a plurality of non-weakened portions 140 having substantially uniform non-weakened portion widths 144. However, the non-weakened portion widths 144 may be non-uniform in a film 120.

FIG. 5 is cross-sectional view of a film 120 having weakened portions 160 that may be formed in a film 120. In an embodiment, the film thickness 126 may be in the range of from approximately 5 microns to approximately 5,000 microns (0.0002 to 0.20 inch). However, the film 120 may be provided in any film thickness 126, without limitation. The weakened portions 160 may have a weakened portion width 170. The weakened portions 160 may be spaced apart from one another and may define a non-weakened portion width 144. The non-weakened portions 140 may be formed in a generally elongated cross-sectional shape 154 or in a ribbon-shaped configuration 152 which may have a relatively high aspect ratio. In an embodiment, the non-weakened portion 140 may have an aspect ratio of a non-weakened portion 140 width to film thickness 126 of from approximately 3 to approximately 500 although the non-weakened portion 140 may have any aspect ratio of any value.

The weakened portions 160 may be formed in a film 120 such as a stretched film 132 by any one of a variety of different means for achieving a reduction in a property of the film 120 within the weakened portion 160 relative to the property in a non-weakened portion 140. For example, weakened portions 160 may be formed in a film 120 by chemical modification 190 of the film 120 and/or by geometric modification 192 (FIG. 6) of the film 120.

In FIG. 5, chemical modification 190 of a film 120 to form the weakened portions 160 may include localized exposure of the film 120 to ultraviolet radiation or to other forms of radiation such as electron beam radiation. Radiation may be applied to the film 120 in the desired location of a weakened portion 160 to alter, modify and/or weaken the molecular bonds of the film 120. Exposure to radiation may induce chain scission which may result in a reduction in molecular bond strength. A byproduct of radiation exposure may include a localized change in color of the film 120. However, color changes may be reduced or minimized by thermal treatment or optical annealing. Chemical modification 190 may also include exposure of a film 120 to a laser which may result in localized heating of the film 120 and which may cause the polymeric film material to have different properties.

In FIG. 5, chemical modification 190 may additionally include selective doping of the film 120 to add a softening agent or hardening agent to localized areas of the film 120 where it is desired to form a weakened portion 160. Chemical modification 190 may also include applying a variety of materials that are known to locally degrade the performance of polymeric film 120 material. Chemical modification 190 may further include fabricating the film 120 with a slightly different material composition in the weakened portions 160 relative to the material composition in the non-weakened portions 140. For example, a film 120 may be formed having a reduced molecular weight of the polymer chains in the weakened portions 160 relative to the molecular weight of the polymer chains in the non-weakened portions 140 which would advantageously provide substantially identical optical properties in the weakened portion 160 and non-weakened portion 140 with a reduced material strength in the weakened portion 160. In an embodiment, chemical modification 190 may be provided with a weakened portion width 170 which may vary (not shown) along a length of a weakened portion 160. Likewise, chemical modification 190 may be provided at different weakened portion depths 172. The weakened portion depth 172 may be measured from a film surface 128 of a film 120 such as a stretched film 132.

FIG. 6 is cross-sectional view of the stretched film 132 illustrating an embodiment of a geometric modification 192 to form the weakened portions 160. The geometric modification 192 may include a localized reduction 194 in the film thickness 126. Such localized reduction 194 in the film thickness 126 may result in a reduction in the strength (e.g. reduced tensile strength) of the film 120 relative to the strength of the film 120 in non-weakened portions 140 of the film 120. The localized reduction 194 in the film thickness 126 may be provided by forming a groove, a notch, or a scratch along a length of the stretched film 132 at any weakened portion depth 172. The geometric modification 192 may locally reduce the film thickness 126 such that the weakened portion thickness 174 is less than approximately 90 percent of the film thickness 126. For example, the stretched film 132 may be geometrically modified such that the weakened portion thickness 174 is approximately 10 percent to 90 percent of the film thickness 126 although other relative thicknesses are contemplated outside of the 10 to 90 percent range.

Although a V-shaped groove is shown, the geometric modification 192 may be formed in any size, shape, and configuration without limitation. For example, geometric modification 192 of a film 120 may be provided by scoring a line into a constant thickness film 120 to remove material from the film 120. Geometric modification 192 of a film 120 may also be provided by forming or molding the geometric modification 192 into the film 120 during fabrication of the film 120. Although a groove, notch or scratch in the film 120 may result in undesirable optical effects, such optical effects may be mitigated by filling the groove, notch, scratch, or other geometric modification 192 with an optically-matched material such as matrix resin or adhesive layer 112 material. Such material may be applied during layup of the composite article 100. Undesirable optical effects may also be avoided or mitigated by forming the geometric modification 192 as an infinitely-thin cut (not shown) or an infinitely-thin slice (not shown) extending along a length of the stretched film 132 at any weakened portion depth 172 on one or both sides of the film 120. Advantageously, such an infinitely-thin cut or slice may locally weaken the stretched film 132 without removing material from the stretched film 132. Although the weakened portions 160 are shown as being generally parallel with the stretched direction 134, the weakened portions 160 may be formed in general alignment with the transverse direction 136 or in any other direction as was indicated above.

FIG. 7 is a top view of a portion of a film 120 illustrating an embodiment of a geometric modification 192 of a film 120 to form weakened portions 160. The weakened portions 160 are shown as a continuous scoring 196 of the film 120 in shape of a line 176. The weakened portions may extend in a lengthwise path 162 along the film 120. Although the weakened portions 160 are shown as being generally parallel with the stretched direction 134, the weakened portions 160 may be oriented in any direction relative to the stretched direction 134 and are not limited to being oriented generally parallel to the stretched direction 134.

FIG. 8 shows an embodiment of a film 120 wherein the weakened portions 160 may be formed as a series of discrete or localized geometric modifications 192 arranged in a predetermined pattern in the film 120. For example, the weakened portions 160 may be comprised of a series of indentations 198 or depressions that may be formed in one or both of the opposing film surfaces 128. Such indentations 198 may result in localized reductions 194 in the cross-sectional area of the film 120. Although FIG. 8 shows a series of indentations 198 formed in a generally straight line, the indentations 198 may be arranged in any pattern, orientation, or configuration, without limitation. Undesirable optical effects of the localized indentations 198 may be mitigated by applying an optically-matched material to the indentations 198 as indicated above.

FIG. 9 is a top view of an embodiment of a film 120 having weakened portions 160 formed in a pattern similar to the pattern illustrated in FIG. 4 and described above. However, the non-weakened portions 140 in the embodiment of FIG. 9 include transverse weakened segments 166 oriented generally perpendicularly relative to the weakened portions 160. Each one of the transverse weakened segments 166 may extend between at least two of the weakened portions 160 to define a plurality of non-weakened portions 140 each having a rectangle 178 shape. The transverse weakened segments 166 define a non-weakened portion length 142. The lengthwise weakened segments 164 define a non-weakened portion width 144. The interconnection of the lengthwise weakened portions 160 may result in further weakening of the film 120 and provide an additional means for controlling the failure of the film 120.

FIG. 10 is top view of an embodiment of a film 120 having a plurality of weakened portions 160 each forming a tortuous path 180. Each one of the tortuous paths 180 may include lengthwise weakened segments 164 that are offset from one another and which are interconnected by transverse weakened segments 166 to form a stepped shape 182. The lengthwise weakened segments 164 may be oriented generally parallel to the stretched direction 134 of the film 120. The stepped shape 182 shown in FIG. 10 results in non-weakened portions 140 having a ribbon-shaped configuration 152 with a substantially constant cross sectional area along a direction of the film length 122. The stepped shape 182 arrangement shown in FIG. 10 results in relatively sharp corners which may increase the capability of the film 120 in absorbing energy from an impact such as from a projectile.

Figure 11:
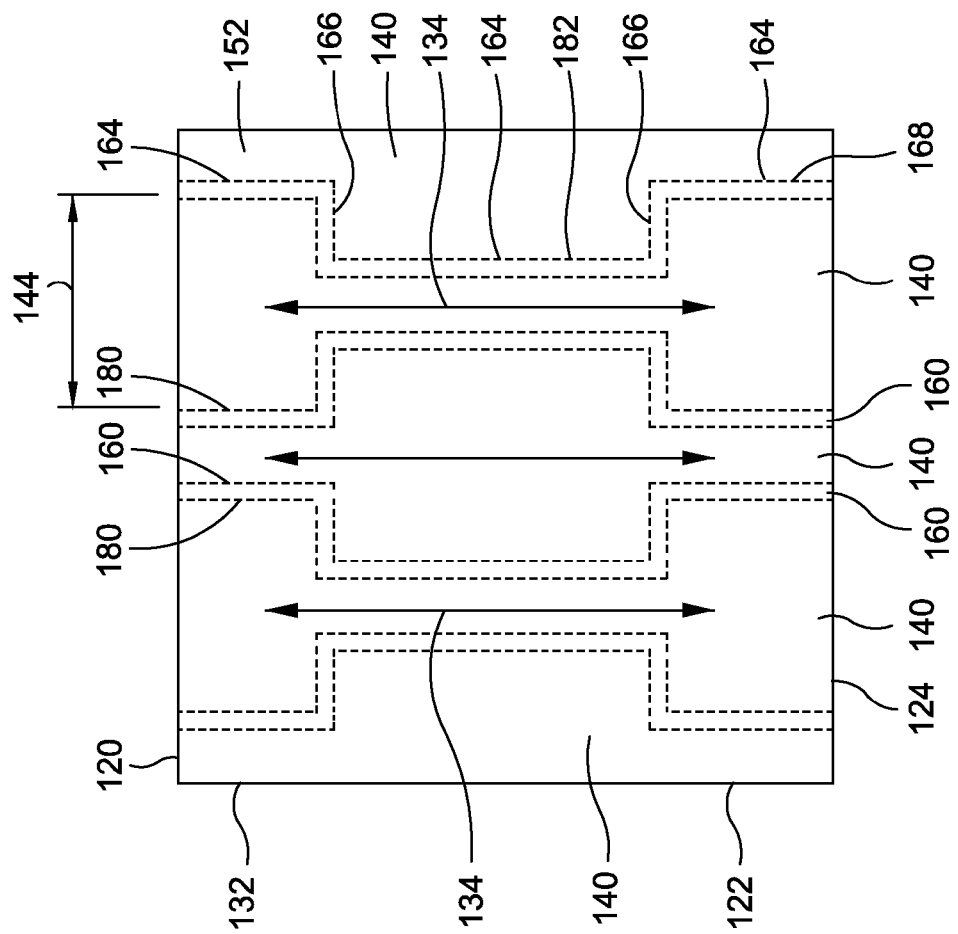
FIG. 11 is a top view of an embodiment of a film having weakened portions wherein the stepped shapes face in opposite directions.

FIG. 11 is a top view of a further embodiment of the stepped shape 182 arrangement of weakened portions 160. The stepped shape 182 arrangement may result in non-weakened portions 140 having a ribbon-shaped configuration 152 with a varying cross sectional area along a direction of the film length 122. In this regard, the varying cross sectional area may include variations in the non-weakened portion width 144 of the non-weakened portions 140. The step arranged in FIG. 11 may result in the in-plane movement (e.g., shape change) of the non-weakened portions 140 during an impact event.

FIGS. 12-13 are top views of a tortuous path 180 embodiment wherein the weakened portions 160 are arranged in a sinusoidal shape 184. The sinusoidal shape 184 may reduce stress concentrations that may otherwise occur in the stepped shape 182 embodiments shown in FIGS. 10 and 11. The tortuous path 180 embodiment of FIG. 12 has substantially uniform spacings between the weakened portions 160. The ribbon-shaped configuration 152 of the non-weakened portion 160 results in a substantially uniform non-weakened portion widths 144. FIG. 13 illustrates a tortuous path 180 embodiment having different spacings between the weakened portions 160 which may alter the energy-absorbing capability of the film 120 relative to the embodiment of FIG. 12. In any of the tortuous path 180 embodiments, the periodicity and the amplitude of the sinusoidal shape 184 may be altered to achieve a desired failure mode and/or a desired energy-absorbing capability of the film 120.

Figure 15:
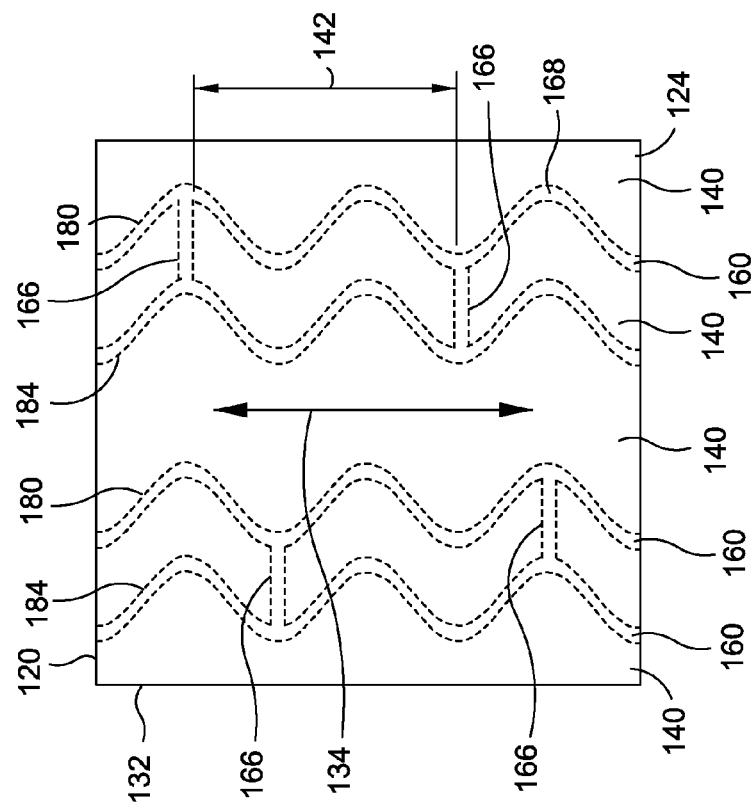
FIG. 15 is a top view of an embodiment of a film having transverse weakened segments interconnecting adjacent pairs of sinusoidally shaped weakened portions.
Figure 14:
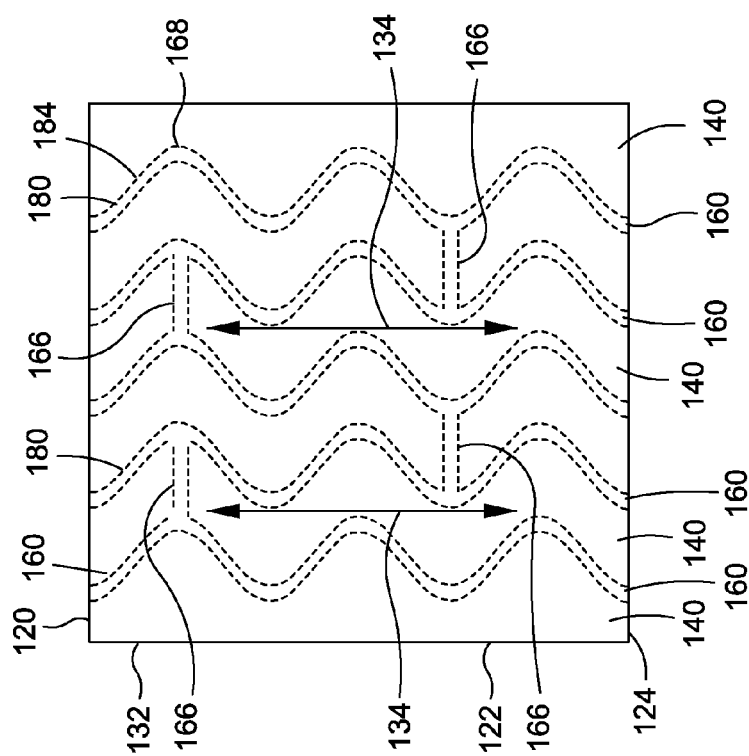
FIG. 14 is a top view of an embodiment of a film having transverse weakened segments interconnecting the sinusoidally shaped weakened portions.

FIGS. 14-15 are top views of the tortuous path 180 embodiments similar to FIGS. 12-13, respectively, and further including transverse weakened segments 166 interconnecting the sinusoidal shapes 184 of the weakened portions 160. The transverse weakened segments 166 may be positioned at different locations for achieving a desired degree of weakening of the films 120. In FIG. 15, the spacing between a pair of the transverse weakened segments 166 may define a non-weakened portion length 142 of a non-weakened portion 160. As may be appreciated, the arrangement, pattern, orientation, and interconnection of the weakened portions 160 using the transverse weakened segments 166 may be arranged to achieve the desired degree of weakening of the film 120.

FIGS. 16-17 are top views of an embodiment of the film 120 having weakened portions 160 arranged in an end-to-end series of lengthwise weakened segments 164. Each gap between the ends of adjacent lengthwise weakened segments 164 comprises a non-weakened connection 146. FIG. 16 illustrates the non-weakened connections 146 in an aligned arrangement 148 with one another in the film 120. FIG. 17 illustrates the non-weakened connections 146 in a staggered arrangement 150. The non-weakened connections 146 may mechanically couple an adjacent pair of non-weakened portions 140 of the film 120. In this regard, the non-weakened connections 146 may limit the degree of relative movement of the interconnected non-weakened portions 140 which may provide an additional means for controlling the failure mode and/or the energy-absorbing capability of the film 120. The non-weakened connections 146 may be spaced at any desired interval or in any pattern of intervals to achieve a desired failure response of the film 120 and/or a desired failure response of the composite article 100.

FIG. 18 is a perspective illustration of a corrugated composite article 200. The corrugated composite article 200 includes a plurality of corrugated films 204 arranged in a stacked formation 130. Each corrugated film 204 may have a corrugated configuration in the sense that the corrugated films 204 may form a sinusoidal cross-sectional shape 206. However, the corrugated films 204 may be provided in a cross sectional shape such as a square wave cross-sectional shape, a sawtooth cross-sectional shape, or cross-sectional shapes other than a sinusoidal cross-sectional shape 206.

FIG. 19 is an exploded perspective illustration of the corrugated composite article 200. The corrugated films 204 are arranged in a stacked formation 130. One or more of the corrugated films 204 may include an adhesive layer 112 interposed between the corrugated films 204 for adhesively bonding the corrugated films 204 together. Each one of the corrugated films 204 may include a series of generally parallel ridges 210 and troughs 214. Each one of the ridges 210 may have a ridge orientation 212. The composite article 100 may include a pair of face sheets 202 mounted on opposite sides of the stacked formation 130 of the corrugated films 204. The face sheets 202 may be formed of composite material such as polymeric film material and may have a generally planar shape. However, the face sheets 202 may be provided in non-planar shapes such as in a shape that may match the cross-sectional shape of a corrugated film 204.

In FIG. 19, each one of corrugated films 204 may comprise a stretched film 132 having a stretched direction 134. In addition, each one of the corrugated films 204 may include a plurality of weakened portions 160 which may be oriented in a lengthwise path 162 along the corrugated film 204. In the embodiment shown, a portion of the corrugated films 204 may be configured such that the weakened portions 160 in a stretched film 132 are oriented generally perpendicular to the ridge orientation 212 of the stretched film 132 and generally perpendicular to the stretched direction 134 of the corrugated film 204. In addition, a portion of the corrugated films 204 may be configured such that the weakened portions 160 in a stretched film 132 are oriented generally parallel to the ridge orientation 212 of the stretched film 132 and generally parallel to the stretched direction 134 of the corrugated film 204. As mentioned above, in a composite article 100, the weakened portions 160 and the stretched directions 134 may be oriented in any direction relative to one another.

Figure 20:
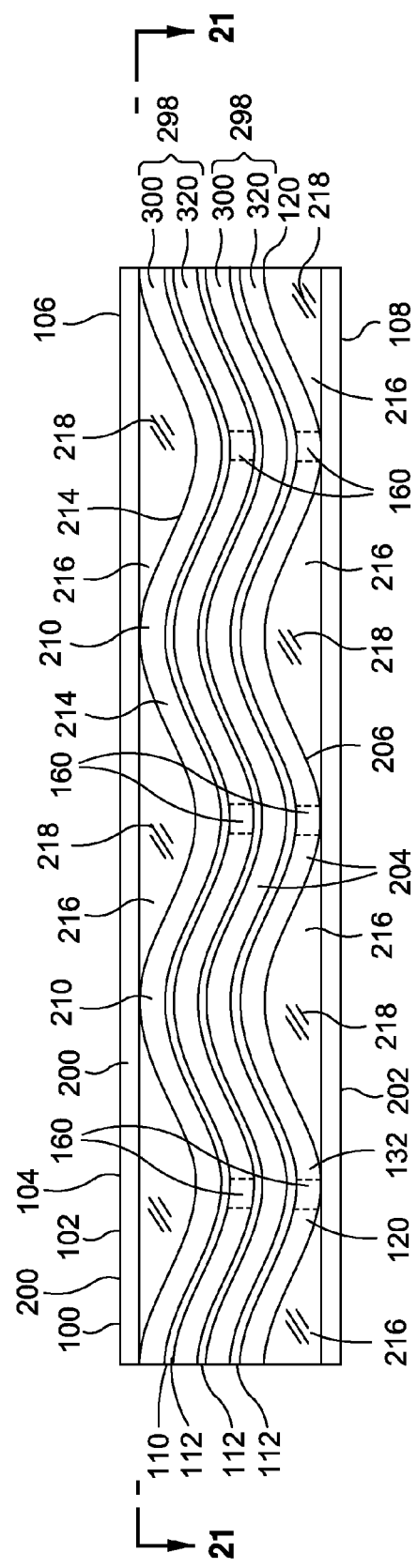
FIG. 20 is a side view of the composite article of FIG. 18 illustrating the corrugated films arranged in a stacked formation between a pair of face sheets.

In FIG. 20, shown is a side view of the corrugated composite article 200 of FIGS. 18-19. The corrugated films 204 may be bonded by the adhesive layers 112. As was indicated above, corrugated films 204 may include ridges 210. The ridges 210 of the outermost corrugated films 204 may define gaps 216 between the corrugated film 204 and the adjacent face sheet 202. The gaps 216 may be substantially filled with a filler matrix 218 (e.g., an adhesive filler) to bond each face sheet 202 to the immediately adjacent corrugated film 204.

Advantageously, the corrugated composite article 200 may provide an increased capability for absorbing energy from an impact such as from a projectile (not shown). In this regard, the corrugated cross-sectional shape of the corrugated films 204 may act as springs wherein the corrugated films 204 may absorb kinetic energy from an impact. For example, during an impact event, the weakened portions 160 of the corrugated film 204 may initially fail. The non-weakened portions 140 (FIG. 12) of the corrugated film 204 may continue to deflect and elongate while absorbing energy from an impact event. The elongation of the corrugated films 204 may urge the corrugations toward a more flattened or planar shape. The urging of the corrugated films 204 toward a more flattened shape may result in an increased amount of kinetic energy absorption during the impact event. As may be appreciated, the failure mode and the energy-absorbing capability of the corrugated composite article 200 may be controlled by controlling the amplitude and periodicity of the corrugated films 204.

In FIG. 21, shown is a top cutaway view of the corrugated films 204 of the corrugated composite article 200. The corrugated films 204 are arranged such that a cross-pattern of weakened portions 220 is formed. The cross-pattern of weakened portions 220 may provide a desired energy-absorbing capability of the composite article 100 (FIG. 20). In this regard, the energy-absorbing capability of the corrugated composite article 200 (FIG. 20) may be controlled by controlling the size, shape, configuration, and orientation of the weakened portions 160 relative to the stretched direction 134 and relative to the ridge orientations 212 of the corrugated films 204. Embodiments may be provided wherein the corrugated films 204 may be unidirectionally stretched, bidirectionally stretched, or combinations thereof, as described above.

In any the embodiments disclosed herein, the arrangement of the weakened portions 160 of the films 120 or stretched film 132 of a composite article 100 may be substantially similar from film 120 to film 120. However, the arrangement of the weakened portions 160 may vary from film 120 to film 120 within a composite article 100. Even further, a film 120 may have different arrangements of weakened portions 160 at different locations of the film 120. In addition, it is contemplated that a composite article 100 may be fabricated having some films 120 that include weakened portions 160 and other films 120 that do not include weakened portions 160.

In any of the embodiments disclosed herein, the quantity, location, pattern, size, (depth, width, length), and type (e.g., chemical modification 190, geometric modification 192) of the weakened portions 160 may be provided based on a variety of factors. Such factors may include the desired amount of weakening provided by each film 120, the failure mechanism of each film 120 or stack of films 120, and on other factors such as ballistic event factors and environmental factors. Ballistic event factors may include projectile velocity, projectile mass, projectile hardness, geometric size and cross-sectional area of the projectile, and other factors related to the projectile. Environmental factors may include temperature, humidity, and other factors.

In any of the embodiments disclosed herein, the film 120 may be formed of any suitable thermoplastic material, thermosetting material, and/or glass material, without limitation. The adhesive layer 112, and/or the matrix material 110 may be formed of a thermoplastic material and/or a thermosetting material. In an embodiment, the film 120 may be formed of a thermoplastic material comprising at least one of the following materials: acrylics, nylon, fluorocarbons, polyamides, polyethylenes, polyesters, polypropylenes, polycarbonates, polyurethanes, polyetheretherketone, polyetherketoneketone, polyetherimides, stretched polymers and any other suitable thermoplastic material. Alternatively, the film 120, the adhesive layer 112, and/or the matrix material 110 may be formed of a thermoset which may include any one of the following: polyurethanes, phenolics, polyimides, bismaleimides, polyesters, epoxies, silsesquioxanes and any other suitable thermoset material. For cases where the film 120 comprises a stretched film 132, the stretched film 132 may be formed of a thermoplastic material including, but not limited to, one of the above-mentioned thermoplastic materials. In an embodiment, the film 120, the adhesive layer 112, and/or the matrix material 110 may be formed of a metallic material.

In an embodiment, the films 120, the adhesive layers 112, and/or the matrix material 110 may be formed of a substantially optically transparent material that is at least partially transmissive of incoming light rays (not shown) directed toward the composite article 100 and/or that are incident upon the composite article 100 (FIG. 20). For example, at least a portion of the films 120, the adhesive layers 112, and/or the matrix material 110 may be substantially optically transparent in the visible spectrum, the near visible spectrum, and/or the near infrared spectrum. However, the films 120, the adhesive layers 112, and/or the matrix material 110 may be formed of substantially non-transparent or opaque material.

Although the composite articles 100 (FIG. 1) such as the corrugated composite articles 200 (FIG. 20) are shown and described in the context of a composite panel 104 (FIGS. 1 and 20), the composite article 100 may be configured in any one of a variety of different shapes, sizes and configurations. In this regard, the composite article 100 may be configured for use in any vehicular or non-vehicular application. For example, the composite article 100 may be configured as a transparency of a vehicle such as an aircraft. The composite article 100 may also comprise a windshield or a canopy of an aircraft. The composite article 100 may additionally be configured for use as a window in any vehicular or non-vehicular application. Even further, the composite article 100 may be implemented as a membrane, an armor panel, a structural panel, an architectural panel, a non-structural panel or article, or in any other implementation of the composite article 100, without limitation.

In an embodiment, a composite article 100 may be fabricated using a plurality of couplets 298 comprising a first stretched film 300 and a second stretched film 320 wherein the stretched directions 306, 326 may be oriented in any angle relative to one another. For example, in the embodiment shown in FIG. 2, the composite article 100 is arranged such that the stretched directions 306, 326 of the first and second stretched film 300, 320 in each couplet 298 are oriented generally perpendicular to one another. However, the composite article 100 may be fabricated using a plurality of stretched films having stretched directions oriented in non-perpendicular relation to one another including in parallel relation to one another.

Figure 22:
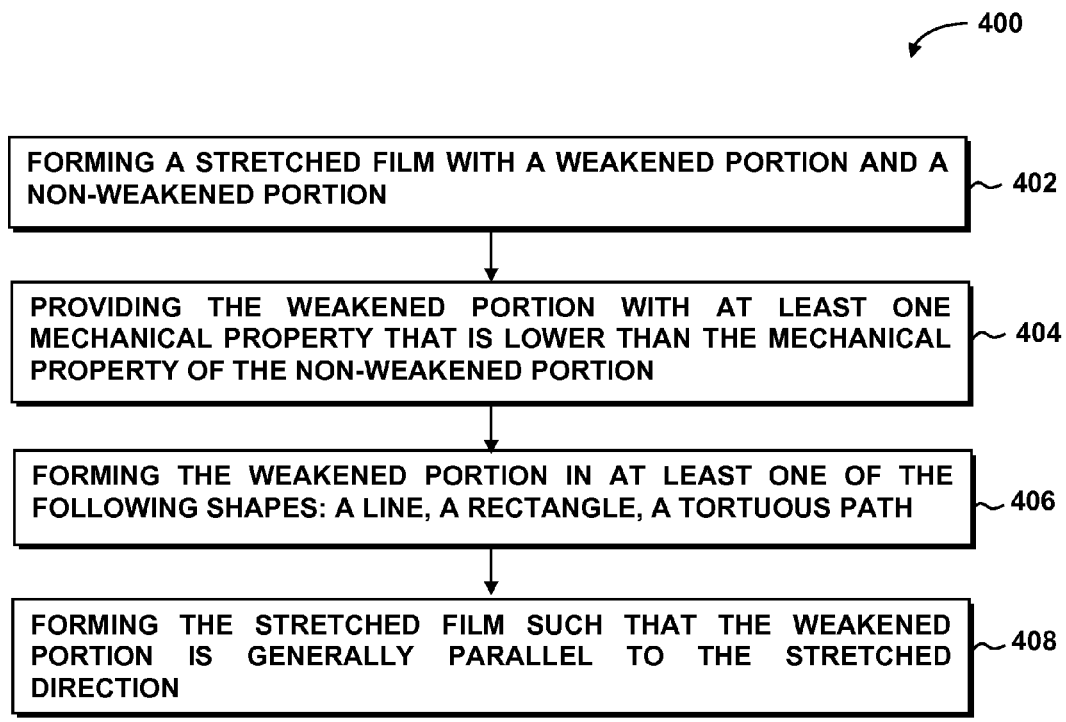
FIG. 22 is a flow chart illustrating one or more operations that may be included in a method of manufacturing a film having weakened portions.

FIG. 22 is a flow chart of a method 400 of manufacturing a film 120 having weakened portions 160 (FIG. 2). The film 120 (FIG. 2) may comprise a stretched film 132 (FIG. 2) as indicated above. Step 402 of the method 400 may include forming the stretched film 132 having at least one weakened portion 160 and a non-weakened portion 140 (FIG. 2). One or more weakened portions 160 may be formed in an existing stretched film 132 by chemical modification 190 (FIG. 5) and/or geometric modification 192 (FIG. 5) of the stretched film 132 as described above. Alternatively, weakened portions 160 may be formed in the stretched film 132 during manufacturing of the stretched film 132. The weakened portions 160 may be formed in any one of a wide variety of patterns, shapes, and orientations as described above.

Step 404 of the method 400 of FIG. 22 may include configuring the stretched film 132 (FIG. 6) such that a weakened portion 160 of the stretched film 132 has at least one property that is lower than a property of a non-weakened portion 140. For example, the weakened portions 160 of a stretched film 132 may be chemically modified relative to the non-weakened portion 140 of the stretched film 132 such that the chemical modification causes the weakened portion 160 to have a tensile strength, a tensile modulus, an ultimate strain, and/or other property that is lower than the tensile strength, the tensile modulus, the ultimate strain, and/or other property of the non-weakened portions 140 of the stretched film 132. Alternatively, the weakened portions 160 of a film 120 may be geometrically modified causing the film 120 to have a reduced strength such as a reduced tensile strength and/or a reduced transverse shear strength relative to the tensile strength and/or transverse shear strength of the film 120 in a non-weakened portion 140.

Step 406 of the method 400 of FIG. 22 may comprise forming a weakened portion 160 (FIG. 9) in a predetermined pattern or shape in a film 120 (FIG. 9). For example, the method may include forming weakened portions 160 in a film 120 wherein the weakened portions 160 form the shape of a line 176 (FIG. 7) and/or a rectangle 178 (FIG. 9). Weakened portions 160 may also be formed in a tortuous path 180 such as the stepped shapes 182 shown in FIGS. 10-11 or the sinusoidal shapes 184 shown in FIGS. 12-15. However, the weakened portions 160 may be formed in a variety of alternative configurations of a tortuous path 180.

Step 408 of the method 400 of FIG. 22 may comprise forming the stretched film 132 such that the weakened portions 160 are generally parallel to the stretched direction 134 of the stretched film 132. For example, FIG. 2 illustrates an embodiment of a composite article 100 wherein the weakened portions 160 form a lengthwise path 162 that is parallel to the stretched direction 134 of the film 120. Alternatively, FIG. 19 illustrates a corrugated composite article 200 wherein a portion of the corrugated films 204 include weakened portions 160 oriented parallel to the stretched direction 134 of the corrugated film 204 and a portion of the corrugated films 204 include weakened portions 160 oriented perpendicular to the stretched direction 134 of the corrugated film 204. As indicated above, the corrugated films 204 are not limited to having weakened portions 160 that are oriented either parallel or perpendicular to the stretched direction 134 and may include weakened portions 160 oriented at any angle relative to the stretched direction 134 of the corrugated films 204.

Figure 23:
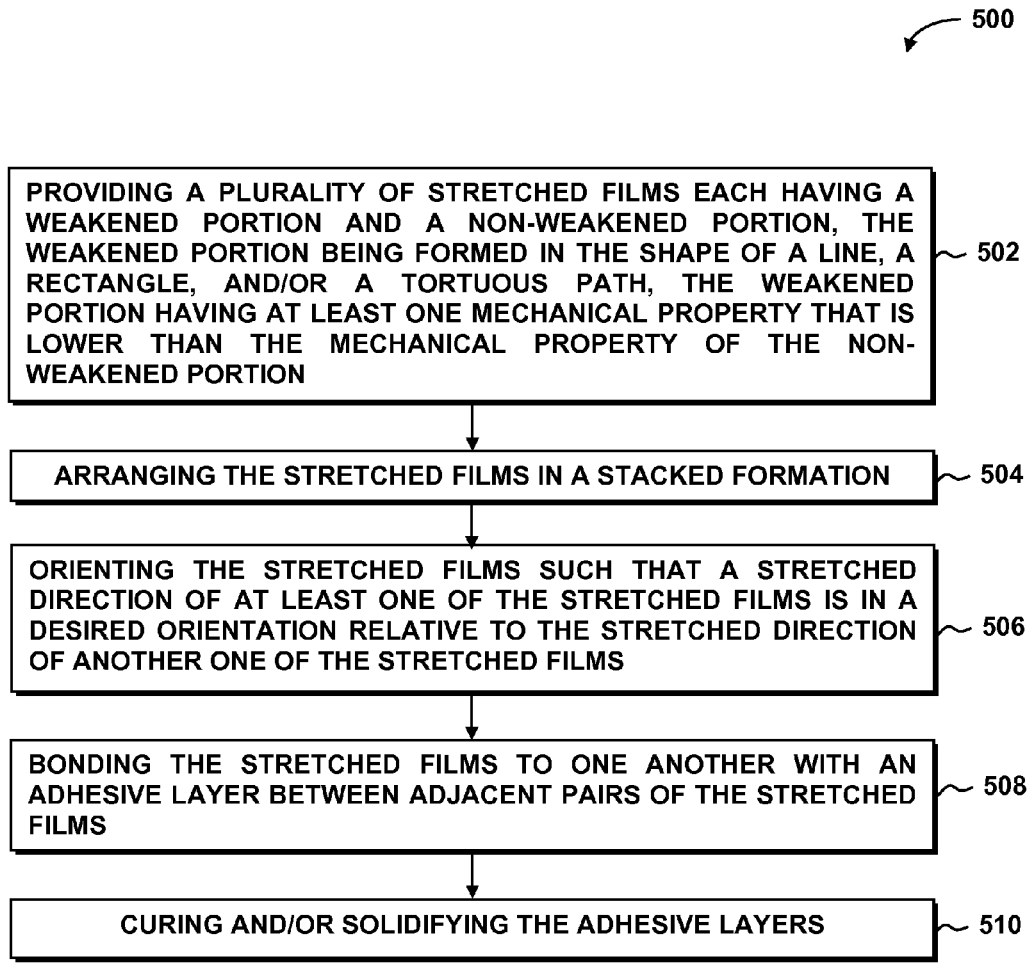
FIG. 23 is a flow chart illustrating one or more operations that may be included in a method of manufacturing a composite article.

FIG. 23 is a flow chart of a method 500 of manufacturing a composite article 100 (FIG. 1). Step 502 of the method 500 may include providing a plurality of stretched films 132 (FIG. 2) each having at least one non-weakened portion 140 (FIG. 2) and at least one weakened portion 160 (FIG. 2). The weakened portions 160 of the stretched films 132 may have the shape of a line 176 (FIG. 7), a rectangle 178 (FIG. 9), and/or the weakened portions 160 may be oriented along a tortuous path 180 (FIG. 10). As indicated above, the weakened portions 160 may have at least one property that is lower than the property of the non-weakened portion 140.

Step 504 of the method 500 of FIG. 23 may include arranging the plurality of the stretched films 132 (FIG. 18) in a stacked formation 130 (FIG. 18). The stretched films 132 may be formed at substantially the same size and/or shape although the stretched films 132 may be provided in different sizes and shapes. The stretched films 132 may be aligned in general registration with one another in the stacked formation 130.

Step 506 of the method 500 of FIG. 23 may include orienting the stretched films 132 such that the stretched direction 134 (FIG. 19) of one the stretched films 132 (FIG. 19) is oriented in a desired orientation relative to the stretched direction 134 of another one of the stretched films 132. For example, in the embodiment shown in FIG. 2, the stretched direction 134 of the first stretched film may be oriented generally perpendicularly relative to the stretched direction 134 of the second stretched film 320. By orienting the stretched directions 134 at non-parallel orientations relative to one another, the composite article 100 (FIG. 19) may provide improved capability for absorbing kinetic energy of a projectile due to the initial failure of the films in the weakened portions 160 (FIG. 19). As described above, the initial failure of the weakened portions 160 of a film 120 (FIG. 18) may be followed by increased deflection and elongation of the non-weakened portions 140 (FIG. 19) of the film 120. Deflection and elongation of the non-weakened portions 140 of the film 120 may result in the involvement of a relatively large portion of films 120 which may increase the overall energy-absorbing capability of a composite article 100.

Step 508 of the method 500 of FIG. 23 may include bonding the stretched films 132 to one another with adhesive layers 112 that may be located between the stretched films 132. As shown in FIGS. 2 and 19, one or more adjacent pairs of films 120 may include an adhesive layer 112 for bonding the films 120 together along the faying surfaces of the stretched films 132.

Figure 24:
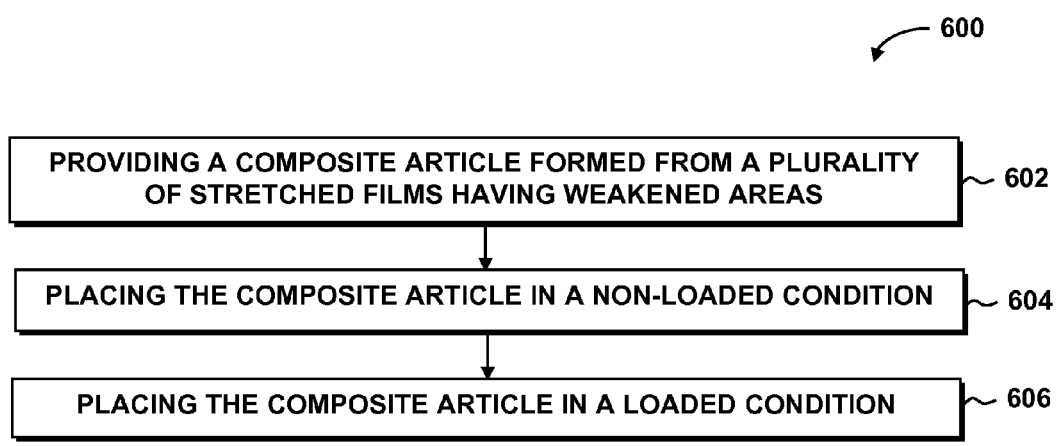
FIG. 24 is a flow chart illustrating one or more operations that may be included in a method of using a composite article.

Step 510 of the method 500 of FIG. 24 may include curing and/or solidifying the adhesive layers 112 (FIG. 19). For example, heat and/or pressure may be applied to a composite article 100 (FIG. 19). The heat may cause a reduction in the viscosity of the adhesive layers 112 which may promote the bonding of the stretched films 132 (FIG. 19). Pressure may be applied to consolidate the composite article 100.

FIG. 24 is a flowchart of a method 600 of using a composite article 100. Step 602 of the method 600 may include providing a composite article 100 (FIG. 1) having a plurality of films 120 wherein each one of the films 120 may have weakened portions 160 (FIG. 2) and non-weakened portions 140 (FIG. 2) as described above. The weakened portions 160 may have at least one property that may be lower than the property of the non-weakened portions 140.

Step 604 of the method 600 of FIG. 24 may include placing or maintaining the composite article 100 (FIG. 1) in a non-loaded condition. The non-loaded condition may comprise a static condition of the composite article 100. For example, the composite article 100 may comprise a portion of a vehicle 701 (FIG. 25) that is static or substantially non-moving. In an embodiment, the vehicle 701 may comprise an aircraft 700 (FIG. 25).

Figure 25:
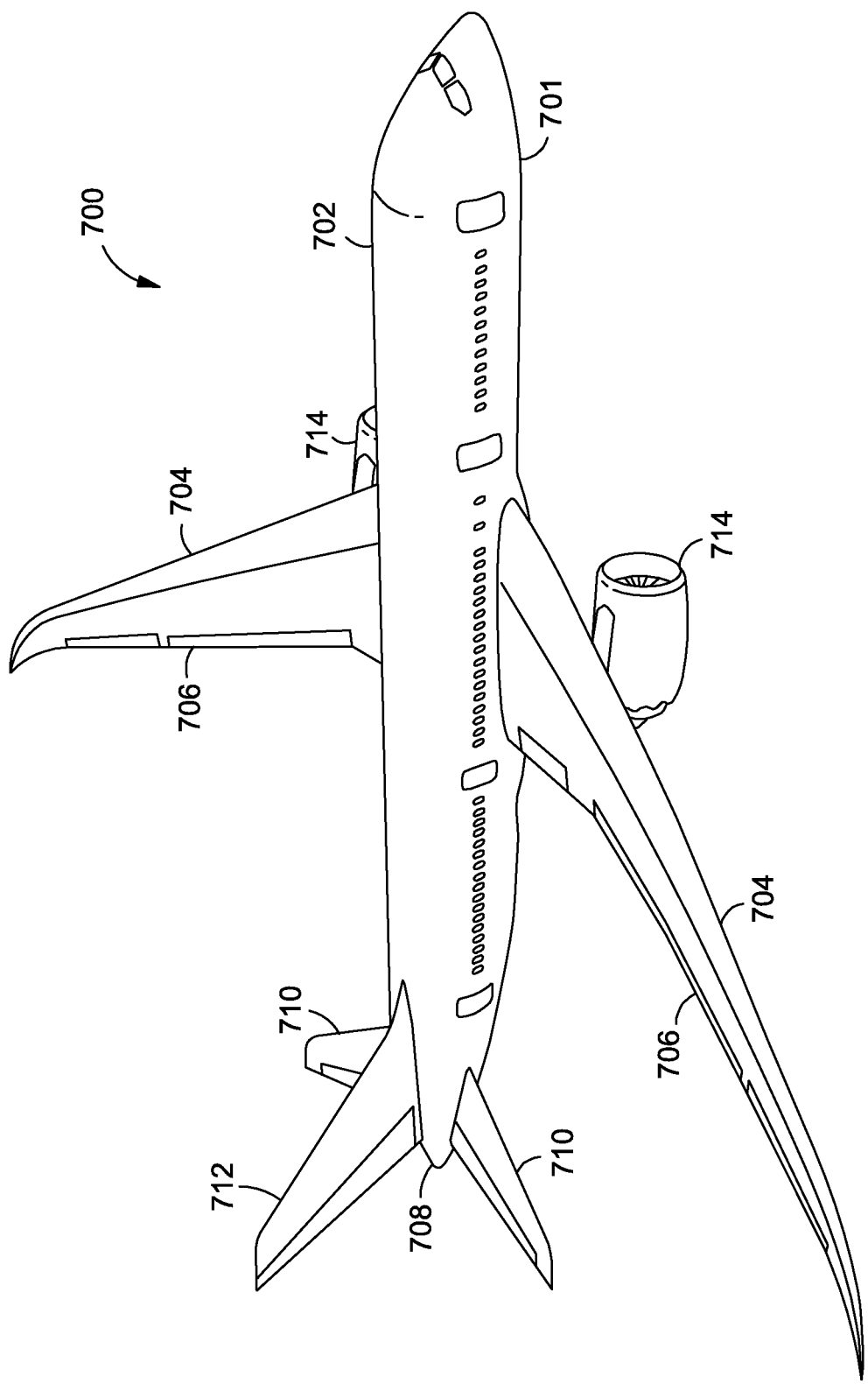
FIG. 25 is a perspective illustration of an aircraft which may incorporate the composite article in one or more embodiments.

Referring to FIG. 25, shown is a perspective illustration of an aircraft 700 which may incorporate one or more embodiments of the composite article 100 (FIG. 1) as disclosed herein. The aircraft 700 may include a fuselage 702 having a pair of wings 704 and a tail section 708 which may include a vertical stabilizer 712 and horizontal stabilizers 710. The aircraft 700 may further include control surfaces 706 and propulsion units 714. The aircraft 700 may be generally representative of one of a variety of vehicles that may incorporate one or more of the composite articles 100 as described herein.

In an embodiment, the composite article 100 (FIG. 1) may comprise a composite panel 104 (FIG. 1). In the non-loaded condition, loads on the composite panel 104 may be limited to static loads due to gravitational force acting on a mass of the composite panel 104 or other static loads acting on the aircraft 700 (FIG. 25). An example of a non-loaded condition may include the aircraft 700 fuselage 702 (FIG. 25) being un-pressurized such as when the aircraft 700 is parked on an airport tarmac.

Step 606 of the method 600 of FIG. 24 may include placing the composite article 100 (FIG. 1) in a loaded condition wherein the vehicle may be in motion and/or the composite panel 104 (FIG. 1) may be subjected to a dynamic load. For example, the vehicle may comprise the aircraft 700 (FIG. 25) in motion on a runway during takeoff. The loaded condition may also comprise the aircraft 700 fuselage 702 (FIG. 25) being pressurized. In the loaded condition, loads on the composite article 100 may include any one of compression loads, tension loads, shear loads, torsion loads, or any combination thereof.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A non-fibrous film for a composite article, comprising:
 a plurality of non-fibrous non-weakened portions extending along the length of the non-fibrous film;
 a plurality of non-fibrous weakened portions having one of the following three arrangements:
  (a) at least one of the non-fibrous weakened portions having a tortuous shape and being non-intersected by any transverse weakened segments along the length of the non-fibrous film;
  (b) at least one of the non-fibrous non-weakened portions having a tortuous shape and being non-interrupted by any transverse weakened segments along the length of the non-fibrous film;
  (c) some of the non-fibrous weakened portions being intersected by transverse weakened segments and at least one of the non-fibrous weakened portions being non-intersected by transverse weakened segments extending from opposite sides of the weakened portion at the same location thereon along the length of the non-fibrous film, the weakened portions being continuously straight along the length of the non-fibrous film;
 wherein each transverse weakened segment is non-parallel to the weakened portions; and
 the weakened portions having at least one property that has a value that is lower than the value of the property of the plurality of non-weakened portions.

2. The film of claim 1, wherein:
 the property comprises at least one of a tensile strength, a tensile modulus, and an ultimate strain.

3. The film of claim 1, wherein:
 the non-fibrous film comprises a stretched film having a stretched direction oriented generally parallel to a lengthwise direction of the weakened portions.

4. The film of claim 1, wherein:
 the non-fibrous film comprises a corrugated film having a corrugated cross-sectional shape.

5. The film of claim 1, wherein:
 the non-fibrous film has a film thickness in a range of from approximately 3 microns to 5000 microns.

6. The film of claim 1, wherein:
 at least one of the non-weakened portions has an elongated cross-sectional shape with an aspect ratio of a non-weakened portion width to a film thickness of approximately 3 to approximately 500.

7. The film of claim 1, wherein the film is formed from at least one of:
 a thermoplastic material, a thermosetting material, and a metallic material.

8. The film of claim 7, wherein:
 the non-fibrous film comprises a stretched film formed of thermoplastic material.

9. The film of claim 8, wherein:
 the stretched film is one of unidirectionally stretched and bidirectionally stretched.

10. The film of claim 1, further comprising:
an adhesive layer located between at least one pair of the non-fibrous films.

11. A composite article, comprising:
a plurality of non-fibrous films arranged in a stacked formation;
at least one of the non-fibrous films having a plurality of non-weakened portions extending along the length of the non-fibrous film;
a plurality of non-fibrous weakened portions having one of the following three arrangements:
   (a) at least one of the non-fibrous weakened portions having a tortuous shape and being non-intersected by any transverse weakened segments along the length of the at least one non-fibrous film;
   (b) at least one of the non-fibrous non-weakened portions having a tortuous shape and being non-interrupted by any transverse weakened segments along the length of the non-fibrous film;
   (c) some of the non-fibrous weakened portions being intersected by transverse weakened segments and at least one of the non-fibrous weakened portions being non-intersected by transverse weakened segments extending from opposite sides of the weakened portion at the same location thereon along the length of the at least one non-fibrous film, the weakened portions being continuously straight along the length of the non-fibrous film;
wherein each transverse weakened segment is non-parallel to the weakened portions; and
the weakened portions having at least one property that has a value that is lower than the value of the property of the plurality of non-weakened portions.

12. The composite article of claim 11, further comprising:
an adhesive layer located between at least one pair of the plurality of non-fibrous films.

13. The composite article of claim 11, wherein:
the property comprises a property including at least one of a tensile strength, a tensile modulus, and an ultimate strain.

14. The composite article of claim 11, wherein:
at least one of the plurality of non-fibrous films comprises a stretched film having a stretched direction oriented generally parallel to a lengthwise direction of the weakened portion.

15. The composite article of claim 14, wherein:
the stretched film is one of unidirectionally stretched and bidirectionally stretched.

16. The composite article of claim 11, wherein:
the plurality of non-fibrous films comprise corrugated films arranged in the stacked formation.

17. The composite article of claim 16, further comprising:
a pair of face sheets mounted on opposite sides of the stacked formation of the corrugated films.

18. A method of forming a film, comprising the steps of:
forming a non-fibrous film having a plurality of non-fibrous non-weakened portions extending along the length of the non-fibrous film, and a plurality of non-fibrous weakened portions having one of the following three arrangements:
   (a) at least one of the non-fibrous weakened portions having a tortuous shape and being non-intersected by any transverse weakened segments along the length of the non-fibrous film;
   (b) at least one of the non-fibrous non-weakened portions having a tortuous shape and being non-interrupted by any transverse weakened segments along the length of the non-fibrous film;
   (c) some of the non-fibrous weakened portions being intersected by transverse weakened segments and at least one of the non-fibrous weakened portions being non-intersected by transverse weakened segments extending from opposite sides of the weakened portion at the same location thereon along the length of the non-fibrous film, the weakened portions being continuously straight along the length of the non-fibrous film;
wherein each transverse weakened segment is non-parallel to the weakened portions; and
configuring the non-fibrous film such that the weakened portions have at least one property having a value that is lower than the value of the property of the non-weakened portions.

19. The method of claim 18, wherein:
the property comprises at least one of a tensile strength, a tensile modulus, and an ultimate strain.

20. The method of claim 18, further comprising the step of:
forming the tortuous shape as lengthwise weakened segments that are offset from one another and which are interconnected by transverse weakened segments.

21. The method of claim 18, further comprising the step of:
providing the non-fibrous film as a stretched film.

22. A method of forming a composite article, comprising the steps of:
providing a plurality of non-fibrous films, at least one of the films having a plurality of non-fibrous non-weakened portions extending along the length of the at least one non-fibrous film, and a plurality of non-fibrous weakened having one of the following three arrangements:
   (a) at least one of the non-fibrous weakened portions having a tortuous shape and being non-intersected by any transverse weakened segments along the length of the non-fibrous film;
   (b) at least one of the non-fibrous non-weakened portions having a tortuous shape and being non-interrupted by any transverse weakened segments along the length of the non-fibrous film;
   (c) some of the non-fibrous weakened portions being intersected by transverse weakened segments and at least one of the non-fibrous weakened portions being non-intersected by transverse weakened segments extending from opposite sides of the weakened portion at the same location thereon along the length of the non-fibrous film, the weakened portions being continuously straight along the length of the non-fibrous film;
wherein each transverse weakened segment is non-parallel to the weakened portions;
the weakened portions having at least one property having a value that is lower than the value of the property of the non-weakened portions; and
arranging the plurality of the non-fibrous films in a stacked formation.

23. The method of claim 22, further comprising the step of:
adhesively bonding at least one pair of the non-fibrous films.

24. The method of claim 22, further comprising the step of:
forming the tortuous shape as lengthwise weakened segments that are offset from one another and which are interconnected by transverse weakened segments.

25. A method of using a composite article, comprising the steps of:
providing the composite article having a plurality of non-fibrous films, at least one of the films having a plurality of non-fibrous non-weakened portions extending along the length of the at least one non-fibrous film, and a plurality of non-fibrous weakened portions having one of the following three arrangements:
(a) at least one of the non-fibrous weakened portions having a tortuous shape and being non-intersected by any transverse weakened segments along the length of the non-fibrous film;
(b) at least one of the non-fibrous non-weakened portions having a tortuous shape and being non-interrupted by any transverse weakened segments along the length of the non-fibrous film;
(c) some of the non-fibrous weakened portions being intersected by transverse weakened segments and at least one of the non-fibrous weakened portions being non-intersected by transverse weakened segments extending from opposite sides of the weakened portion at the same location thereon along the length of the non-fibrous film, the weakened portions being continuously straight along the length of the non-fibrous film;
wherein each transverse weakened segment is non-parallel to the weakened portions;
the weakened portions having at least one property having a value that is lower than the value of the property of the non-weakened portions;
placing the composite article in a non-loaded condition; and
placing the composite article in a loaded condition.

26. The method of claim 25, wherein:
the non-loaded condition is associated with a vehicle being substantially non-moving; and
the loaded condition is associated with the vehicle in motion.

27. A non-fibrous film for a composite article, comprising:
a non-fibrous non-weakened portion extending along the length of the non-fibrous film;
a plurality of non-fibrous weakened portions formed by a localized partial reduction in a film thickness of the non-fibrous film and having one of the following three arrangements:
(a) at least one of the non-fibrous weakened portions having a tortuous shape and being non-intersected by any transverse weakened segments along the length of the non-fibrous film;
(b) at least one of the non-fibrous non-weakened portions having a tortuous shape and being non-interrupted by any transverse weakened segments along the length of the non-fibrous film;
(c) some of the non-fibrous weakened portions being intersected by transverse weakened segments and at least one of the non-fibrous weakened portions being non-intersected by transverse weakened segments extending from opposite sides of the weakened portion at the same location thereon along the length of the non-fibrous film, the weakened portions being continuously straight along the length of the non-fibrous film;
wherein each transverse weakened segment is non-parallel to the weakened portions; and
the non-fibrous weakened portions having at least one property that has a value that is lower than the value of the property of the non-fibrous non-weakened portion.

28. The film of claim 27, wherein:
the property comprises at least one of a tensile strength, a tensile modulus, and an ultimate strain.

29. The film of claim 27, wherein:
the film comprises a stretched film having a stretched direction oriented generally parallel to a lengthwise direction of the non-fibrous weakened portion.

30. The film of claim 27, wherein:
the film comprises a corrugated film having a corrugated cross-sectional shape.

31. The film of claim 27, wherein:
the localized partial reduction in the film thickness comprises at least one of a groove, a notch, a slice, and a series of indentations or depressions.

32. The film of claim 27, wherein:
the non-fibrous film has a film thickness in a range of from approximately 3 microns to 5000 microns.

33. The film of claim 31, wherein:
the film thickness in the weakened portion is between approximately 10-90 percent of the film thickness in the non-weakened portion.

34. A composite article, comprising:
a plurality of non-fibrous films arranged in a stacked formation;
at least one of the films having a plurality of non-fibrous non-weakened portions extending along the length of the at least one non-fibrous film;
a plurality of non-fibrous weakened portions formed by a localized partial reduction in a film thickness of the at least one non-fibrous film, the plurality of non-fibrous weakened portions having one of the following three arrangements:
(a) at least one of the non-fibrous weakened portions having a tortuous shape and being non-intersected by any transverse weakened segments along the length of the at least one non-fibrous film;
(b) at least one of the non-fibrous non-weakened portions having a tortuous shape and being non-interrupted by any transverse weakened segments along the length of the non-fibrous film;
(c) some of the non-fibrous weakened portions being intersected by transverse weakened segments and at least one of the non-fibrous weakened portions being non-intersected by transverse weakened segments extending from opposite sides of the weakened portion at the same location thereon along the length of the non-fibrous film, the weakened portions being continuously straight along the length of the non-fibrous film, at least some of the non-fibrous weakened portions separating adjacent non-weakened portions along an entire length of the at least one non-fibrous film;
wherein each transverse weakened segment is non-parallel to the weakened portions; and
the weakened portions having at least one property that has a value that is lower than the value of the property of the non-weakened portion.

35. The composite article of claim 34, wherein:
the localized partial reduction in the film thickness comprises at least one of a groove, a notch, a slice, and a series of indentations or depressions.

36. The composite article of claim 35, wherein:
the film thickness in the weakened portion is between approximately 10-90 percent of the film thickness in the non-weakened portion.

37. The composite article of claim 34, further comprising:
an adhesive layer located between at least one pair of the plurality of non-fibrous films.

* * * * *